INVENTORS:
Samuel Willits,
William L. Mohan Jr.
and James M. McCarty,

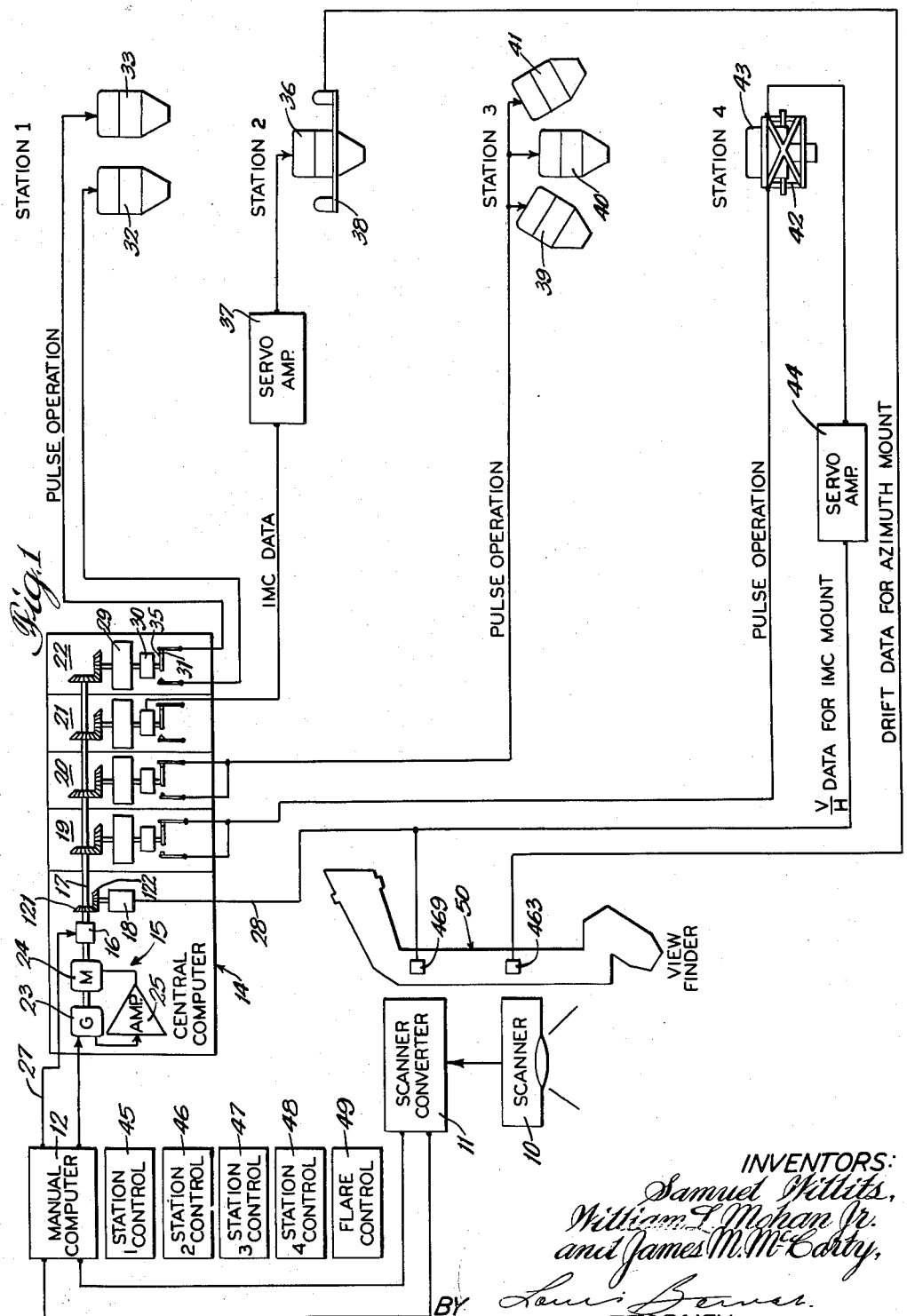

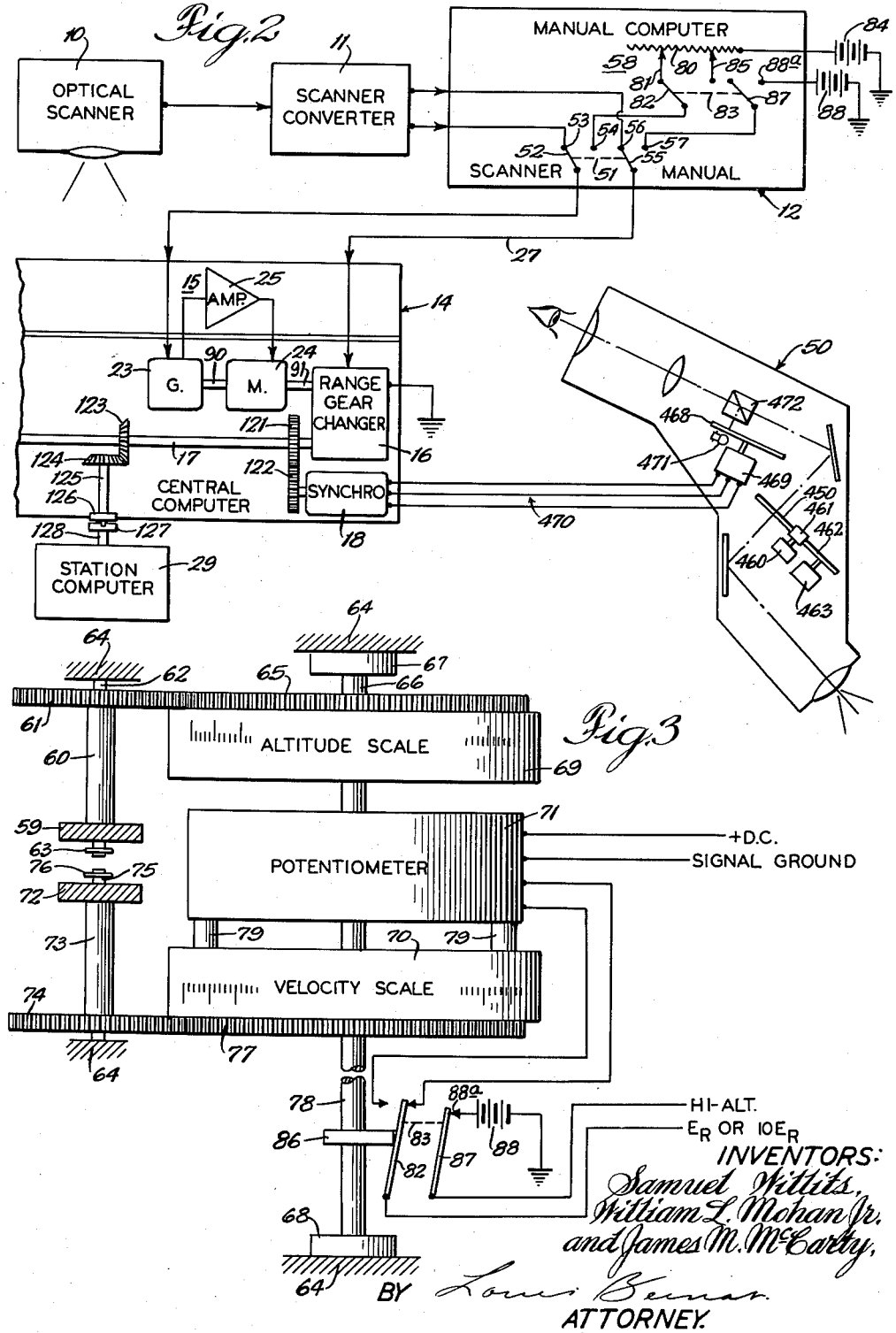

BY
ATTORNEY

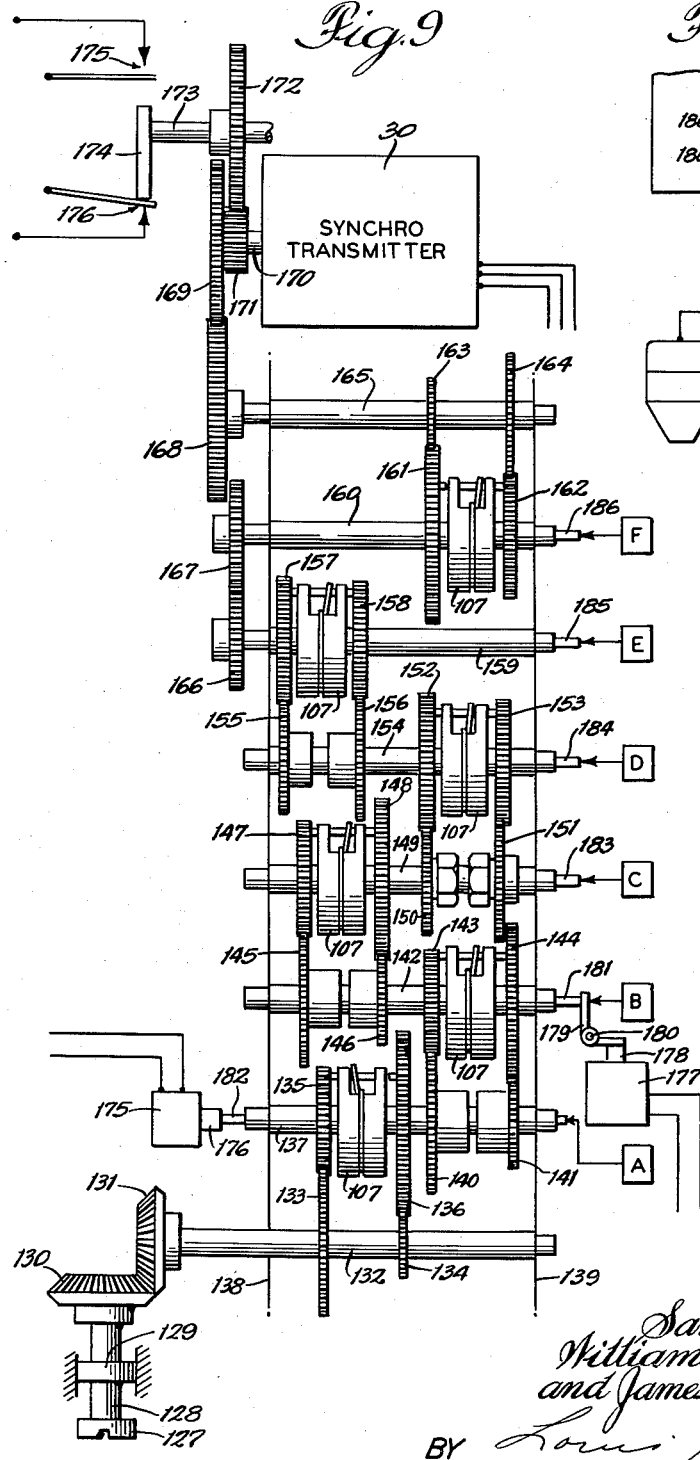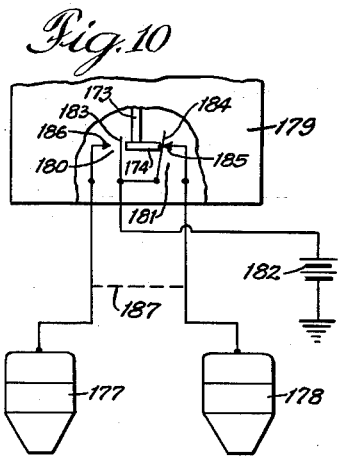

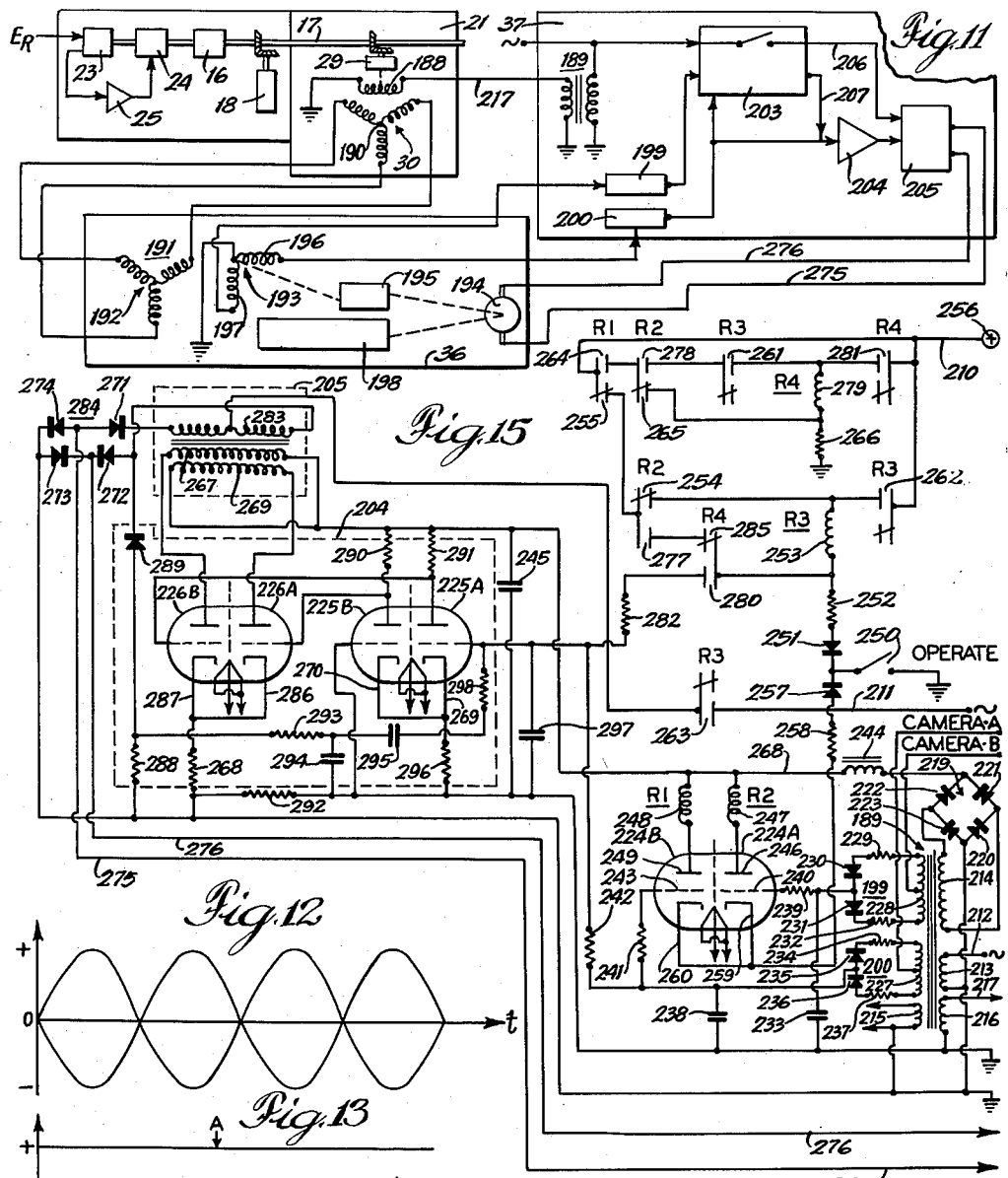

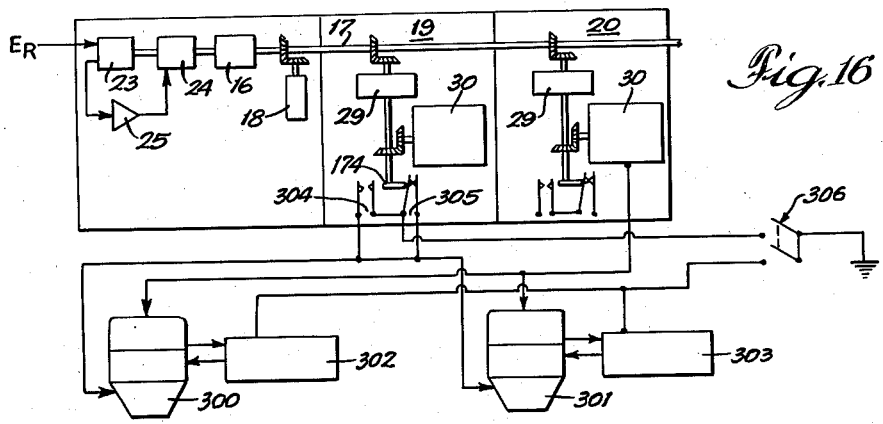
Fig. 16
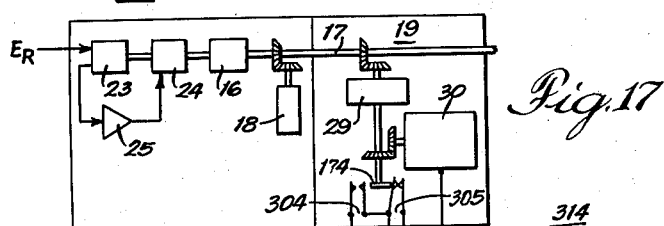
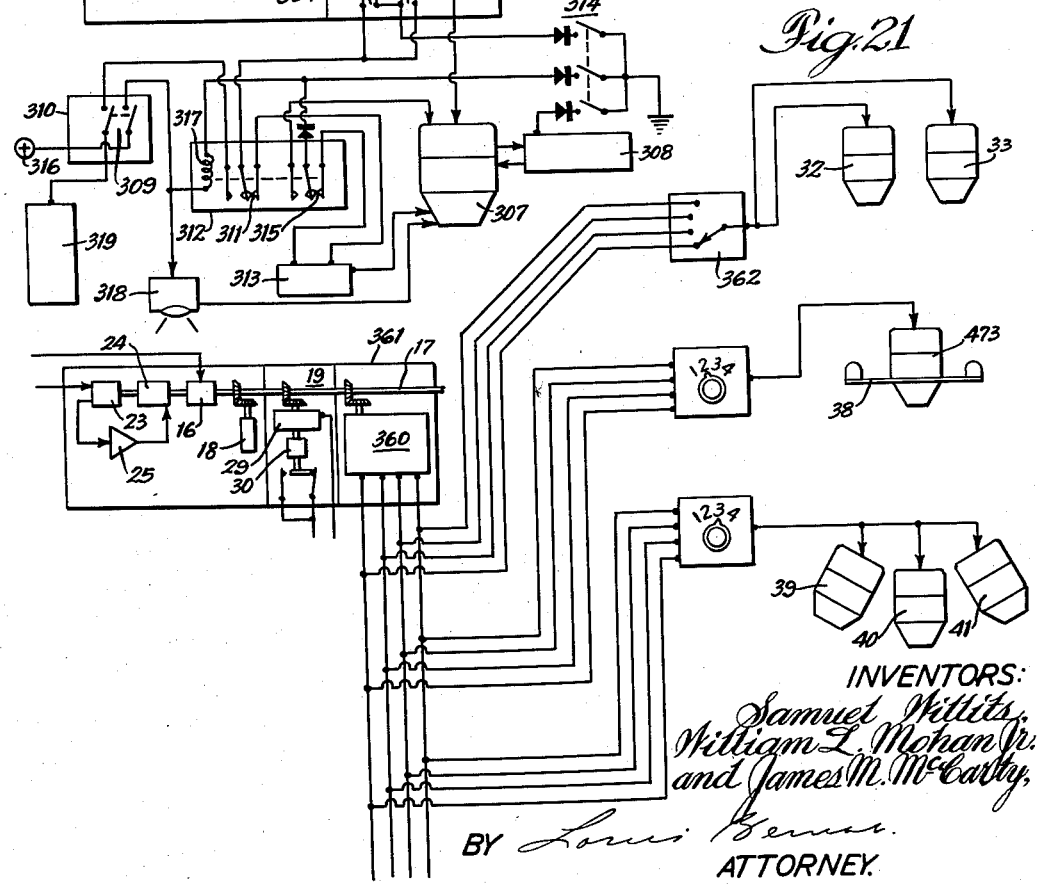
Fig. 17
Fig. 21
INVENTORS:
Samuel Willits,
William L. Mohan Jr.
and James M. McCarty,
BY Louis Bruno
ATTORNEY.

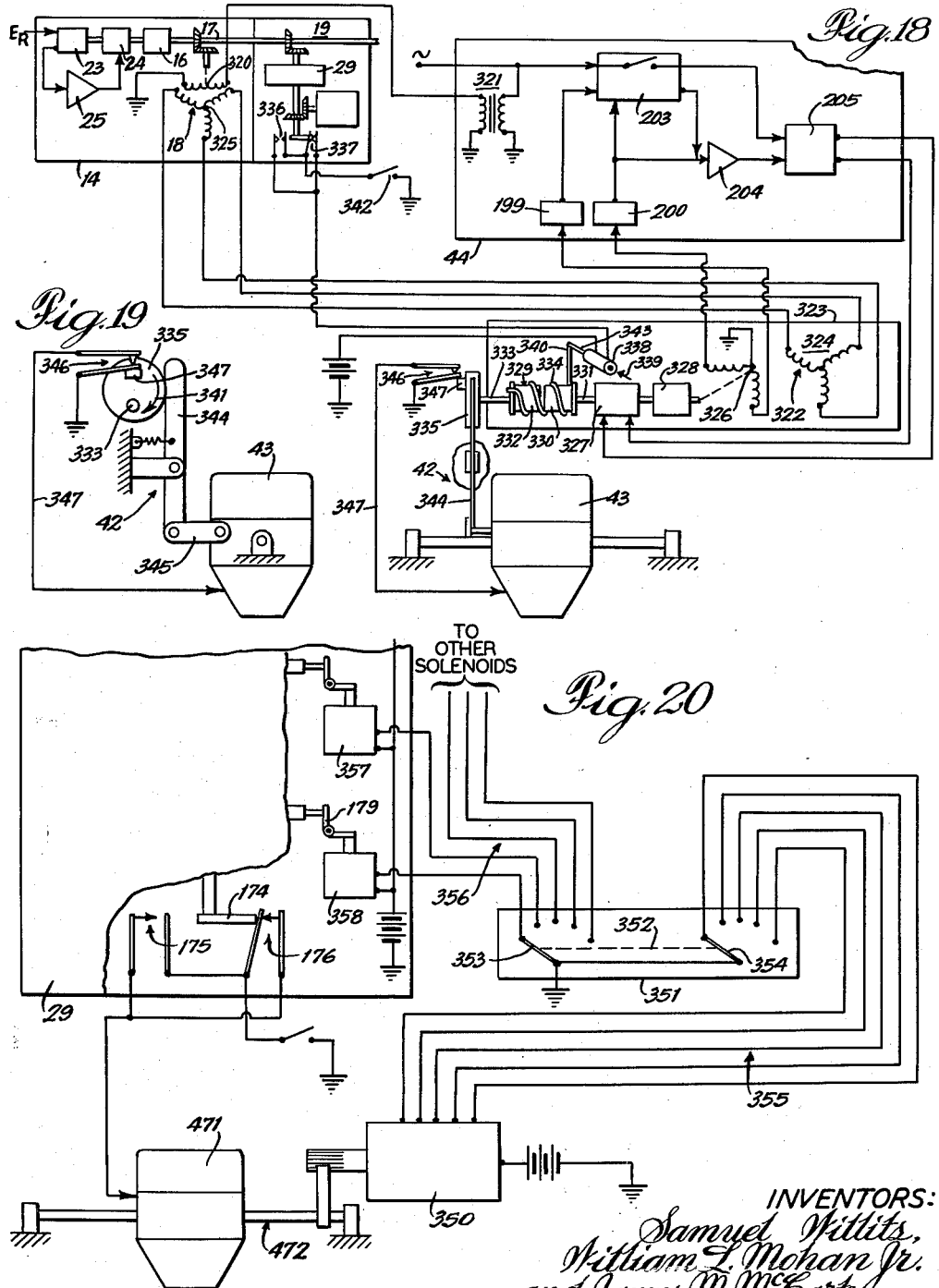

Jan. 10, 1961 S. P. WILLITS ET AL 2,967,470
CONTROL SYSTEM FOR AERIAL PHOTOGRAPHY
Filed March 28, 1957 8 Sheets-Sheet 8
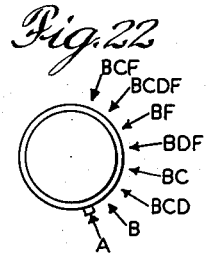
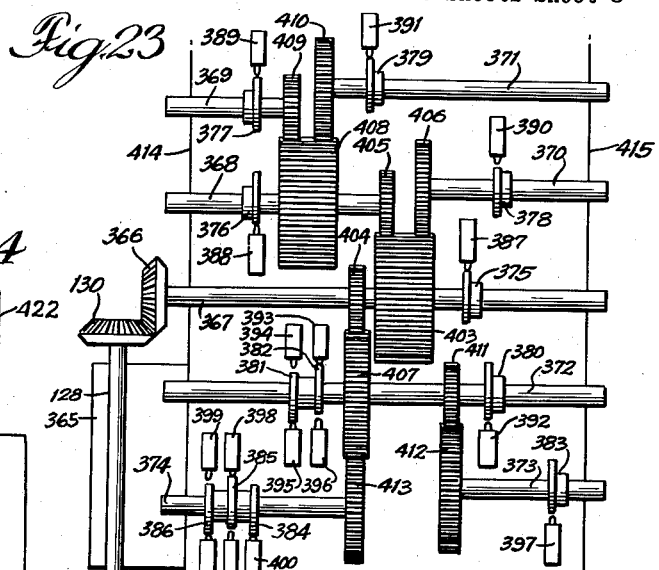
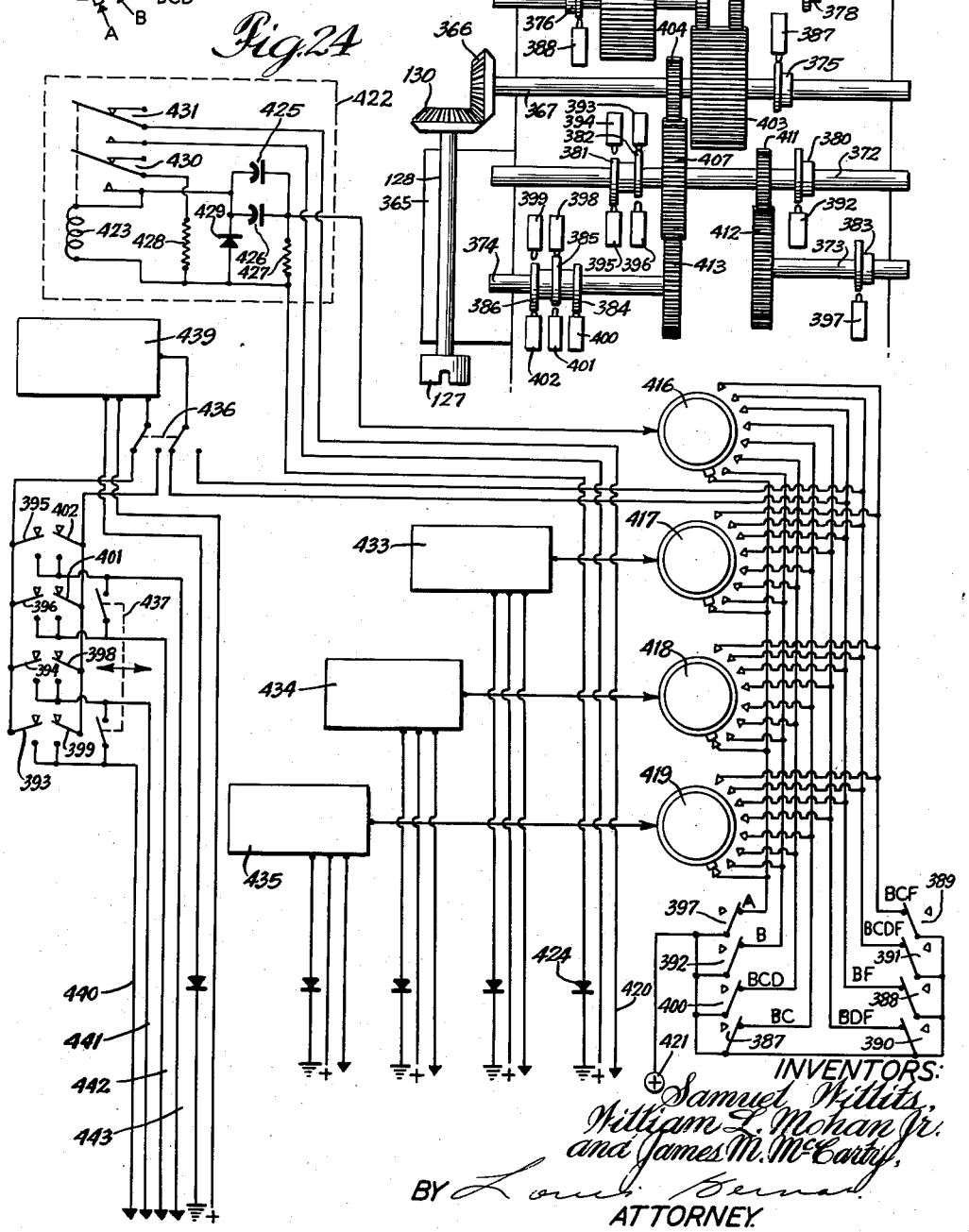
INVENTORS:
Samuel Willits,
William L. Mohan Jr.
and James M. McCarty,
BY Louis Bernard
ATTORNEY United States Patent Office

2,967,470
Patented Jan. 10, 1961

2,967,470

CONTROL SYSTEM FOR AERIAL PHOTOGRAPHY

Samuel P. Willits, Mount Prospect, William L. Mohan, Jr., Prospect Heights, and James M. McCarty, Arlington Heights, Ill., assignors, by mesne assignments, to Chicago Aerial Industries, Inc., Melrose Park, Ill., a corporation of Delaware Filed Mar. 28, 1957, Ser. No. 649,078

32 Claims. (Cl. 95—12.5)

This invention relates generally to a control system for aerial cameras and more particularly to a new and improved control system for one or more aerial cameras in which the picture taking rate and motion imparted to film or camera is controlled to compensate for image motion at the photographic plane.

One of the basic requirements of an aerial camera control system is that it produce negatives of high resolution. One of the features which reduces photographic resolution is image motion. It is known that the effect of image motion may be offset by supplying a compensatory motion to the film or to the camera during exposure.

In view of the increasing capability for speed in present day aircraft, the need for more accurate means to decrease the blurring effect produced by the relative object motion during photographic exposure has become more significant. In the prior art, this compensation has usually been made by rotating the aerial camera at a rate such that the camera optical axes remain aligned with a fixed point on the object plane during exposure or, alternatively, by moving the film in the camera at a rate such that a point on the film remains aligned with a fixed point on the object plane during exposure.

These techniques, which frequently are referred to as image motion compensation or IMC, generally have proven satisfactory since it has been found that the change of the distance or angular position usually is of secondary importance. Such compensatory motion may be defined by the following equation.

$$v = 1.689 F \frac{V}{H} \sine \theta \qquad (1)$$

where:

$v$ = required image motion compensating velocity in inches per second.
$F$ = camera focal length in inches.
$V$ = true aircraft velocity relative to ground in knots.
$H$ = aircraft altitude (terrain clearance) in feet.
$\theta$ = camera focal axis depression angle below the horizontal in degrees.

It also is frequently required that an aerial photographic system be capable of taking pictures at discrete periodic intervals. It may further be necessary that sequential frames or pictures have a predetermined amount of overlap. This overlap, usually expressed as a percentage, is useful in providing stereoscopic viewing of the resultant prints and also in mapping for the purpose of keying a series of photographs together. For maximum usefulness the overlap must be maintained with good precision to avoid changing the trigonometric relationships used in preparing a topographic map. By way of example, the accuracy required by the military services varies between plus or minus 5% and plus or minus 3%. As reduced to practice in the present invention, these limits are substantially bettered.

It will readily be understood by those skilled in the art that the overlap of successive exposures is dependent on the time interval between exposures or the rate at which exposures are made per unit of time. An equation which may be used to determine the picture taking rate for any value of overlap from 0 to 100% is:

$$R = 1.689 \left( \frac{100}{100-K} \right) \frac{F}{P} \frac{V}{H} \sine \theta \qquad (2)$$

where:

$R$ = picture taking rate in exposures per second
$K$ = percent of overlap
$V$ = true aircraft velocity relative to ground in knots.
$F$ = camera focal length in inches
$H$ = aircraft altitude (terrain clearance) in feet
$P$ = film format size in the line of flight in inches; and
$\theta$ = camera focal axis depression angle below the horizontal in degrees.

For the purpose of the description which follows it should be noted that in Equations 1 and 2 above, velocity (V) and altitude (H) of the aircraft are the only variables subject to change during flight. These elements are designated as in-flight variables. The remaining elements of Equations 1 and 2 are known before the flight and hence are designated as pre-flight variables.

Several control systems for aerial photography which provide for the control of the picture taking rate and image motion compensation are known but the degree of accuracy attained by such prior art systems has not proved entirely satisfactory. For the control of IMC, the majority of prior art systems have means for providing an electrical potential proportional to aircraft velocity and altitude. This potential then is fed into an electronic computer in combination with the data corresponding to the pre-flight variables to provide an output voltage proportional to all of the variables. This output voltage then is applied to a conventional velocity servo mechanism to control the speed of the film drive motor or the velocity of a camera mount.

The accuracy of systems of the type just described is dependent upon a number of independent variables. These include the accuracy with which the velocity to altitude ratio V/H is determined and maintained, the degree of precision with which this ratio is converted to an electrical potential, the accuracy of the electronic computer that integrates the pre-flight variables into the computation and finally, the ability of the velocity servo mechanism to translate the computed output potential into the desired velocity.

Further, a variety of systems have hitherto been devised to control the picture taking interval. One of the most common of these is a manually set timing device which uses a constant speed drive mechanism to control a switch initiated camera operation. Devices of this type normally are referred to as intervalometers and although they generally are accurate, they also are cumbersome to utilize since they require laborious calculations on the part of the operator. They also have the disadvantage that when either of the in-flight variables is changed, the calculations must be repeated and re-entered into the intervalometer. This obviously is unsatisfactory under conditions such as military reconnaissance where evasive action often must be taken during a photographic run.

It has not hitherto been known how to devise an aerial photographic control system which is capable of providing image motion compensation and control of the picture taking rate with the precision required for present day aircraft. More simply, prior to this invention there has not been available aerial camera control mechanisms having the accuracy required for reducing the factors detracting from photographic resolution to only the camera optical system, the film characteristics, and flight turbulence.

Accordingly, it is a primary object of this invention to provide a new control system for aerial photography which is characterized by its improved accuracy of image motion compensation and its control of the picture taking rate.

It is a more specific object of this invention to provide an improved aerial photographic control system capable of precisely measuring aircraft angular velocity and accurately converting this information into compensatory film velocity and picture taking rate control.

It is still another object of this invention to provide such an improved aerial photographic control system in which the entry and computation of pre-flight variables is greatly simplified and which is capable of automatically adjusting to changes in the in-flight variables.

It is a further object of this invention to provide an improved control system for aerial photography which permits continuous monitoring of the source of information of in-flight data.

It is still another object of this invention to provide such a control system having means for substantially eliminating any computation for the manual entry of the in-flight data when it is not available from an automatically operating source.

Still another object of this invention is the provision of means for synchronizing the operation of a camera with a mechanical shaft rotation in a more precise manner than was heretofore possible.

It is another object of this invention to provide a control system for aerial photography adapted to control several different types of cameras without requiring modification of the cameras. More particularly, it is an object of this invention to provide an improved camera control system for image motion compensation and picture taking interval control which is not limited as to film format dimensions, film transport mechanism and camera focal length.

It is a still further object of this invention to provide an improved system capable of synchronizing the exposures of a plurality of cameras which have their respective optical axes at various angles of depression relative to the horizontal.

Still another object of this invention is the provision of an improved aerial camera control system capable of operating several cameras in a predetermined repetitive sequence.

Still another object of this invention is the provision of a system capable of selective action in accordance with the camera focal axis depression angle below the horizontal wherein image motion compensation and picture taking rate is readjusted to the correct value corresponding to this angle each time the angle is changed.

In accordance with a specific illustrative embodiment of the invention these and other objects are attained in a novel aerial camera control system which employs mechanical analogue principles whereby the aircraft angular velocity data $V/H$ is converted to a D.C. potential and this potential then is translated into a corresponding mechanical shaft rotation. Calculations of the picture taking rate and IMC then are effected by a gear ratio changing means to the end that integration of the pre-flight variables is accomplished with substantially zero error. This results in a substantial increase in accuracy over aerial photographic control systems now in use.

A feature of the invention is the use of a rotary synchronous transmitter driven in accordance with the shaft rotation to control the film velocity by means of a positional servo mechanism. Thus, in one aspect of this invention, precise control of film velocity is achieved by utilizing a positional servo mechanism as a velocity control device. This unique arrangement is very effective for even though a positional servo mechanism is subject to certain positional errors with respect to the rotary synchronous transmitter, its angular velocity error essentially is zero.

In another feature of the invention, the rotary synchronous transmitter driven by the shaft rotation in accordance with the angular velocity data $V/H$ is used to control the rocking motion of a swinging or IMC camera mount. Thus, the camera in the mount is rocked in an arc at an angular rate corresponding to the $V/H$ data.

Accurate measurement of the aircraft angular velocity and the correction of errors which may result both in the determination of the aircraft angular velocity data and the conversion of this data to compensating film velocity and picture taking interval control information is achieved through the use of an optical view finder which cooperates with a servo mechanism to the end that the compensatory film velocity and picture taking interval control information is present in the view finder field of view as moving grid lines. In accordance with this invention these moving grid lines move in synchronism with the terrain only when the determination and conversion of aircraft angular velocity is correct.

Still another feature of this invention is the provision of a variable speed transmission in combination with a servo mechanism, a rotary synchronous transmitter and cam operated switches to provide compensatory film velocity control and control of the picture taking interval for various cameras in accordance with camera focal length, film format size, focal axis and depression angle below the horizontal. One aspect of the invention is that the rotary synchronous transmitter and the cam operated switches are utilized to provide compensatory film velocity control and control of picture taking rate, respectively.

Still another feature of this invention is the provision of image motion compensation without restriction as to camera film transport mechanism, lens focal length, or film format size by means of a positional servo mechanism which is adapted to cooperate with a pivotable mount and a mount actuating device to the end that the entire camera assembly is rocked at a compensatory angular velocity.

During the course of an aerial photographic flight, it frequently is necessary to obtain photographs at velocity to altitude ratios which exceed the limitations of a single camera as for example, where the picture taking interval becomes less than the camera recycle time. Such limitations are circumvented in accordance with a feature of this invention by a novel arrangement for operating a plurality of cameras in a predetermined repetitive sequence. This result is realized in one illustrative embodiment by the use of cam operated switches, in combination with a variable speed transmission and velocity servo mechanism, as pulse rate dividers and distributors. These act to distribute the basic single camera exposure initiating pulses among two or more channels whose exposure initiating pulse rates then become $$\frac{1}{N}$$

times the basic rate where N is the number of cameras to be operated in the repetitive sequence.

Still another feature of the invention is the synchronization of the exposures of several cameras through the use of positional servo mechanisms whereby the shutters of the several cameras are tripped simultaneously.

The above and other features of novelty which characterize this invention are pointed out with particularity in the claims annexed to and forming a part of this specification. For a better understanding of this invention, however, and its advantages reference is had to the accompanying drawings and descriptive matter in which is illustrated and described several specific illustrative embodiments of the invention.

In the drawings:

Figure 1 is a block diagram illustration of an aerial camera control system embodying features of this invention;

Figure 2 is a schematic and block diagram representation of the invention illustrating the manual computer or automatic scanner control of the central computer;

Figure 3 is a diagrammatic illustration showing in greater detail the construction of the manual computer;

Figure 9 shows the construction of illustrative station computer;

Figure 10 is a simplified schematic diagram illustrating the connection of two pulse cameras for either simultaneous or alternate sequential operation;

Figure 11 is a simplified schematic and block diagram illustrating the connection of an autocycle camera to the camera control system of the invention;

Figures 12, 13 and 14 are waveform diagrams illustrating the operation of the circuits of Figures 11 and 15;

Figure 15 is a schematic diagram of a servo amplifier embodying the invention;

Figure 16 is a simplified schematic and block diagram illustrating the control system connections for the simultaneous operation of two pulse IMC cameras;

Figure 17 is a simplified schematic and block diagram showing a pulse IMC camera connected for day or night operation;

Figures 18 and 19 illustrate the operation of a pulse camera in the IMC camera mount when connected with a camera control system in accordance with the invention;

Figure 20 illustrates the operation of the camera control system with a camera in a rotatable mount but not provided with an IMC mount actuator;

Figure 21 is a schematic and block diagram of an alternate station computer and pulse distribution system for pulse operated cameras;

Figure 22 illustrates a switch of the type which may be used with the station computer of the present invention;

Figure 23 shows in detail the construction of an embodiment of station computer which may be utilized in the system of Figure 21;

Figure 24 is a simplified schematic of the electrical portion of the station computer shown in Figures 21 and 23.

Figure 4:
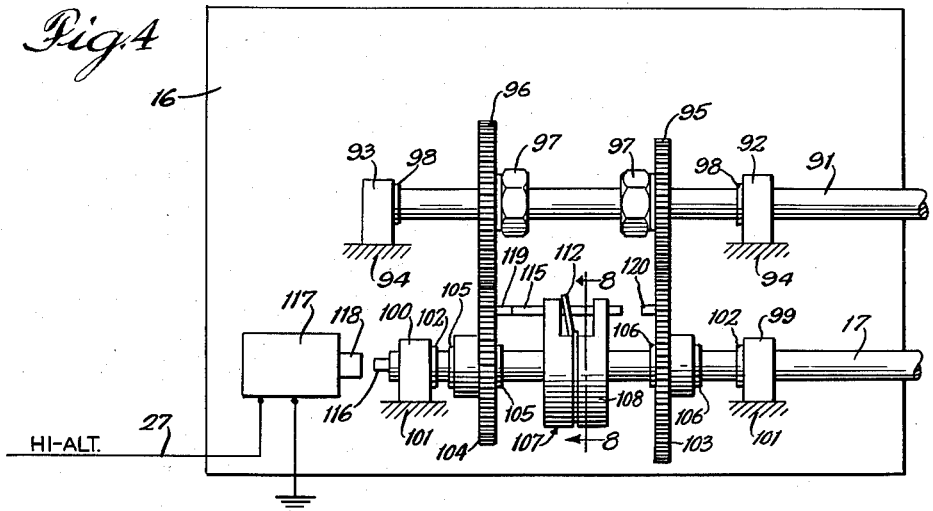
Figures 4, 5, 6, 7 and 8 illustrate the construction of the range gear changing mechanism.

Referring now to the drawing and more particularly to Figure 1, there is shown in block diagram form an illustrative aerial camera control system which is representative of the general principles of the invention. The system comprises an optical scanner, designated by the reference numeral 10, which advantageously may serve as one source of in-flight variable data, namely velocity, V, and altitude above the terrain H. Optical scanner 10 may take any suitable form and advantageously may be as shown in the patent to D. Hancock, Jr. and H. E. Meinema, 2,413,349, issued December 31, 1946. In operation, scanner 10 originates an electrical signal proportional to the velocity to altitude ratio, hereinafter referred to as $V/H$. The scanner signal is applied to a scanner converter 11 where it is converted to a D.C. signal, designated as $E_R$, having an amplitude proportional to the scanner signal. Advantageously, scanner converter 11 may be constructed as disclosed in the above-identified Hancock and Meinema patent.

The D.C. voltage output $E_R$ of scanner converter 11 is applied to a manual computer 12 which also serves as a manually operable alternate source of $V/H$ information in a manner further described below. A switch on manual computer 12 enables the operator to choose between the manual computer 12 and the optical scanner 10 as the source of $V/H$ information for the camera control system. From manual computer 12, the D.C. signal $E_R$ is transmitted to a central computer designated generally at 14.

Central computer 14 comprises a velocity servo system 15, a gear changing mechanism 16, a line shaft 17 coupled to the gear changing mechanism 16 and a synchro transmitter 18 together with a plurality of individual station computer units 19, 20, 21 and 22 each having a station computer 29 coupled to line shaft 17.

In accordance with a feature of this invention, the D.C. voltage $E_R$ is converted to a mechanical shaft rotation in the central computer 14. As will become apparent from the more detailed description given hereinbelow, calculations of the picture taking rate and IMC are made by unique gear ratio changing means to the end that the integration of the pre-flight variables into the computation is accomplished with substantially zero error. This results in a substantial increase in accuracy over the prior art aerial photographic control systems heretofore utilized.

The conversion of the $E_R$ voltage to a shaft rotation is effected in the velocity servo system 15 by the D.C. generator 23, the servo motor 24 and the amplifier 25 which responds to the $E_R$ voltage to vary the speed of motor 24 in accordance with the amplitude of the $E_R$ control signal. Motor 24 has its shaft coupled to the range gear changing mechanism 16 which transmits the motor shaft velocity at a ratio of 1:1 or 1:10 in accordance with a control signal received over conductor 27 from either the scanner converter 11 or the manual computer 12.

Coupled to the output of the range gear changing mechanism 16 is a line shaft 17 which in turn is coupled to a synchro transmitter 18. The output of synchro transmitter 18, as applied over conductor 28 to the control system, is a rotational data reference signal which is a function of $V/H$. A plurality of individual station computer units such as units 19, 20, 21 and 22, also are coupled to the line shaft 17, as by means of suitable bevel gears and the like.

Each of the station computer units comprises a station computer 29 in the form of a gear changing unit which is adapted to provide a plurality of changeable gear ratios to permit computation for desired overlap, focal length, format size and depression angle, otherwise known as the pre-flight variables. The rotational output of each station computer 29 serves to drive the rotor of a synchro transmitter 30 at a speed corresponding to the computed camera cycling rate to thereby provide a rotational IMC reference voltage for one or more cooperating cameras at a given camera station. The output of each station computer 29 also drives pulse switching cam means 31 to provide one or more switch closures for pulsing a single camera or camera array, or two or more cameras operating sequentially. Thus, each station computer 29 is capable of supplying both IMC and pulse information to a camera station.

At camera station 1 in Figure 1 there are shown two pulse type cameras 32 and 33 connected for sequential operation. A pulse camera, as the name implies, operates on the basis of pulsed control signals. When a pulse is received by the camera it actuates the camera shutter which then initiates its own signal to command film winding and rewinding of the shutter if necessary. As cameras of this type operate with a single pulse governing the picture taking rate, it is necessary that the time separation of sequential pulses be greater than the camera recycle time. When the pulse separation is less than the camera recycle time it is necessary to use more than one camera and to distribute the control pulses between cameras.

In the two pulse camera system shown at station 1, the station computer output speed is decreased by suitable gearing to one-half of its normal speed and the two pulse switches are provided 180° apart. Each camera is connected to one switch, as for example, camera 32 to switch 34, and camera 33 to switch 35. In this manner each pulse to a camera occurs at the time it would occur if there had been no gear reduction to the cam 31 operating the switches and each camera then is operated at one-half of the picture taking rate. It will be appreciated that a gear reduction to one-fourth speed for the cam and four switches would provide for sequential operation of four cameras, and, similarly, a gear reduction to one-third speed and three switches would provide for sequential operation of three cameras. Further, a single camera or single camera array may be operated from a station computer having two or more switches and having the switch operating cam appropriately reduced in speed merely by connecting all of the switches together, as illustrated at camera stations 3 and 4 in Figure 1.

Camera station 2 comprises an autocycle camera 36 with its associated servo amplifier 37. Autocycle cameras, or camera magazines, are controlled by an IMC command signal. This command signal controls film speed in that the film holding platen and/or the film is moved at IMC speed and the camera or magazine originates a shutter tripping pulse while the film is moving at this speed. The film is then advanced, normally at a faster rate than IMC speed, to supply fresh film to the exposure area, after which IMC speed is resumed, the shutter tripped, and the cycle repeated. Cameras of this type provide an overlap of sequential exposure based only on camera design.

Similar to the autocycle cameras with reference only to the control signal required are strip cameras. The IMC command signal controls the speed of the film to synchronize it with the image of the ground as the film moves continuously past an open slit.

The illustrative autocycle camera 36 shown at camera station 2 in Figure 1 is adapted to be used in an azimuth mount 38 which corrects the alignment of the camera to compensate for aircraft drift. As illustrated, the autocycle camera 36 receives the IMC command signal from the synchro transmitter in station computer unit 21 through servo amplifier 37 and azimuth mount 38 receives the drift alignment signal from the viewfinder 50.

A tri-camera array comprising cameras 39, 40 and 41, having similar parameters as described above, is shown at camera station 3 connected to be pulsed from the paralleled pulse switches at station computer unit 20. Manifestly, such an arrangement is desirable since the pre-flight data is identical for cameras 39, 40 and 41.

Camera station 4 in Figure 1 comprises a swinging or IMC mount 42 which supports a pulse camera 43. The IMC mount 42 together with its servo amplifier 44 achieves image motion compensation by rocking camera 43 in an arc at an angular rate corresponding to the velocity to altitude ratio $V/H$. As shown, the camera 43 receives its control pulses from the paralleled pulse switches in station computer unit 19, and the IMC mount 42 and servo amplifier 44 receive the $V/H$ data from the synchro transmitter 18 in the central computer.

While the four camera stations shown in Figure 1 illustrate four different camera configurations which advantageously may be used with the novel camera control system of the invention, it will be understood by those skilled in the art that advantageously numerous other camera configurations may be used therewith with equally successful results. For example, all of the camera stations could be provided with pulse IMC cameras for a night reconnaissance flight. In such an application the camera shutter is opened and the film is moved continuously in the camera at a speed determined by an IMC command signal. Pulses from a station computer release a flare cartridge or bomb at intervals in accordance with the desired picture taking rate. The explosion of the flare cartridge or bomb originates a second pulse from a flare detector which closes the shutter and causes the film to recycle after which the shutter reopens. The next computer pulse repeats the sequence, etc. Cameras of this type may be used sequentially in the same manner as pulse cameras.

Day operation of pulse IMC cameras differs principally from night operation in that the computer pulse operates a conventional shutter in place of releasing a flare cartridge or bomb. After shutter closure, the film is advanced and the film velocity returns to the IMC rate until the next shutter operating control pulse. By this method it is possible to vary the overlap of sequential exposures as contrasted with autocycle cameras where this is not possible.

The aerial camera control system shown in Figure 1 also comprises a plurality of station control units 45, 46, 47 and 48 which advantageously may include on-off switches for supplying power to camera stations 1, 2, 3 and 4, respectively. In accordance with an aspect of this invention the supplying of power to the camera stations as well as to other system components, such as optical scanner 10, scanner converter 21, etc., does not permit the taking of pictures but merely permits warm-up of these various components. Picture taking commences when an operating switch, which may be located at any convenient place in the aircraft, is closed.

The camera control system shown in Figure 1 also includes a flare control 49 and a viewfinder shown generally at 50, which is described in greater detail below.

As explained heretofore there is more than one possible source for the $V/H$ control data. A preferred arrangement for the camera control system of the invention would include both the optical scanner 10 together with the scanner converter 11 and the manual computer 12, although it will be understood that only one such source is required.

The optical scanner 10 and its converter 11 function as an automatic source of $V/H$ control data in accordance with the Hancock and Meinema patent identified above. Briefly, the optical scanner 10 originates an electrical signal which has a frequency proportional to the $V/H$ ratio. The scanner converter 11 converts this frequency to a D.C. voltage $E_R$ which has an amplitude proportional to this frequency.

The alternative source of $V/H$ information, the manual computer 12, is shown in greater detail in Figures 2 and 3 of the drawing. The manual computer 12 comprises a double pole, double throw switch 51 which includes a switch blade 52 operatively associated with a pair of stationary contacts 53 and 54, and a switch blade 55 ganged to switch blade 52 and operatively associated with a pair of stationary contacts 56 and 57. Stationary contacts 53 and 56 are connected to the output of scanner converter 11 and in the operating position of switch 51 shown in Figure 2 the $E_R$ control signal from the scanner converter is applied through switch blades 52 and 55 to the central computer 14. Stationary contacts 54 and 57 of switch 51 are connected to terminals of switch 83 in the manual computer potentiometer 58 and in the other operating position of switch 51, the $E_R$ control signal is applied from potentiometer 58 through switch blades 52 and 55 to central computer 14.

The manual computer potentiometer 58 is constructed to permit the shaft with the wiper and the housing to be rotated separately. This is better seen in Figure 3 in which a knob 59 on hollow shaft 60 is shown attached to a gear 61. Hollow shaft 60 is rotatably mounted on stud 62 and is restrained from axial motion by retainer 63. Advantageously, stud 62 may be secured to the support housing 64 in any suitable manner.

Gear 61 meshes with gear 65 which is fixed to the potentiometer shaft 66. Shaft 66 is rotatably mounted in bearings 67 and 68 which are fixed to the support housing 64. An altitude scale 69 is affixed to gear 65 to the end that rotation of knob 59 also rotates potentiometer shaft 66 to provide an indication of the magnitude of rotation by means of the scale 69 and an indicator mark (not shown) attached to the support housing 64.

The velocity scale 70 and the potentiometer housing 71 are actuated in a similar manner. Knob 72 is attached to a hollow shaft 73 which in turn is attached to gear 74. Hollow shaft 73 is rotatably mounted on stud 75 and is restrained from axial movement by retaining ring 76. Stud 75 is secured to the support housing 64 in any suitable manner. Gear 74 meshes with gear 77 which is rotatably mounted on shaft 78. A velocity scale 70 is affixed to gear 77 and, by means of studs 79, to potentiometer housing 71 which carries resistance 80 in a manner well known in the art. It now will be appreciated that rotation of knob 72 results in a rotation of potentiometer housing 71 with an indication of the magnitude of rotation given by velocity scale 70 and an indicator mark (not shown) attached to the support housing 64.

It can be seen from the schematic diagram of Figure 2 that the potentiometer wiper 81 is connected through switch blade 82 of switch 83 to contact 54 of switch 51. Potentiometer wiper 81 is positioned in sliding contact with the logarithmetic resistance element 80 which is connected to a source of potential 84. Thus, when switch 51 is in the Manual position, i.e., with switch blade 52 connected to contact 54 and switch blade 55 connected to contact 57, a potential $E_R$ derived from the potentiometer 58 and the source of potential 84 is supplied to the central computer 18. Conversely, when switch 51 is in the Scanner position, i.e., with switch blade 52 connected to contact 53 and switch blade 55 connected to contact 56, the $E_R$ potential is supplied by the optical scanner 10 and the scanner converter 11. Accordingly, it will be appreciated that switch 51 enables the operator to select the source of $E_R$ voltage from either the automatic scanner system or the potentiometer means of the manual computer.

It is manifest that the ratio of V/H decreases with increasing altitude with a resulting decrease in the $E_R$ voltage. As the $E_R$ voltage decreases, the control voltages supplied to the servo motor 24 also decrease with the result that any errors increase proportionally in magnitude. In accordance with an aspect of this invention, this undesirable result is avoided by an automatic switching circuit in both the scanner converter 11 and the manual computer 12 whereby the $E_R$ voltage is increased by a factor of 10 whenever it falls below a first predetermined level. Control signals thus raised by a factor of 10 are termed High Altitude signals. Similarly, the $E_R$ voltage is decreased by the factor of 10 whenever the control signal returns to a second predetermined level. Advantageously two separate levels are provided for control of the automatic switching circuit. A single predetermined level could be used for this purpose, but this is not preferred due to the possibility of repeated switching taking place for aircraft operation at or near this single level. This possibility is obviated by the provision of separated first and second predetermined levels. As the $E_R$ voltage supplied to the amplifier 25 in the central computer 14 controls the speed of the servo motor 24, the speed of the latter is increased or decreased by the factor of 10 with this change in voltage.

Additionally, a reduction gear train in the range gear changing mechanism 16 is actuated by remotely controlled means whenever the High Altitude signal is present. This gear reduction is engaged to reduce output rotational speed by the same factor of 10 for High Altitude signals and is disengaged whenever the control signals are not in the High Altitude range. Thus, changes in the speed of servo motor 24 due to switching to a higher or lower voltage range are cancelled out and the servo system is operated within a speed range where inaccuracies are held to a minimum.

One illustrative means for accomplishing switching between High Altitude and normal $E_R$ ranges is in the manual computer as shown in Figures 2 and 3. The potentiometer 58 of the manual computer 12 has two wipers 81 and 85 placed with respect to each other such that the potential measured across wiper 85 and potential source 84 is 10 times the potential measured across wiper 81 and potential source 84. A cam 86 secured to shaft 78 of the potentiometer changes the position of switch blades 82 and 87 of switch 83 in response to changes of the altitude setting. Thus, at the predetermined altitude level, the position of switch 83 changes and contact for switch blade 82 is transferred from wiper 81 to wiper 85 or from wiper 85 to wiper 81. At the same time, switch blade 87 of switch 83 opens or closes a circuit between a source of potential 88 and contact 57 of the Scanner-Manual switch 51 for use when switch 51 is in the Manual position to supply power to a magnetic actuating means in the range gear changing mechanism 16. Thus, for the condition where 10 $E_R$ is supplied to the amplifier 25, the gear reduction in range gear changing mechanism 16 is engaged, while for normal values of $E_R$ the gear reduction is disengaged.

It will be appreciated by those skilled in the art that the mechanical switch means for increasing the $E_R$ signal 10-fold as described above may be replaced by any other suitable electrical or electronic means capable of attaining the same result and in another illustrative embodiment it is contemplated that conventional voltage sensitive relays may be substituted for the switch 83 in the manual computer.

In accordance with a major feature of the invention, the $E_R$ signal data is converted to a shaft rotation having a velocity proportional to the amplitude of the $E_R$ signal by the velocity servo system of the central computer indicated generally at 15 in Figures 1 and 2. This servo system comprises a conventional arrangement of an amplifier 25 connected at its output to a D.C. servo motor 24 and at its input to a D.C. generator 23. Motor 24 and generator 23 share a common armature shaft 90 which also is coupled to the range gear changer 16.

The positive $E_R$ control signal from switch blade 52 of the Scanner-Manual switch 51 is connected to the positive terminal of D.C. generator 23 and the negative terminal of the generator 23 is connected to the input of amplifier 25. In this manner the difference between the $E_R$ signal and the output voltage of generator 23 forms the input to the amplifier 25.

When servo motor 24 is operating at a speed less than that required by the $E_R$ signal, the output voltage of generator 23 is less than the $E_R$ signal and a positive difference voltage is supplied to the amplifier 25. Amplifier 25 has a current output which is proportional to the difference voltage applied to its input and for positive difference voltages the current output increases with increases in the voltage input.

The current output of amplifier 25 is applied to the armature of servo motor 24 and as the current output increases, the motor speed and hence the generator speed tends to increase. As generator speed increases the generator voltage increases to thereby reduce the difference voltage between the generator output and the $E_R$ command signal. This process continues until the difference voltage is reduced to zero at which time motor 24 is operating at the speed required by the $E_R$ signal.

It will be understood by those skilled in the art that when the servo motor 24 is operating at a higher speed than that required by the $E_R$ signal, the output of generator 23 is greater than the $E_R$ signal and a negative difference voltage is applied to amplifier 25. Amplifier 25 then decreases its current output to the armature of servo motor 24 and the motor is slowed down until it is operating at the speed required by the $E_R$ signal.

Accordingly, in the manner explained above, the output shaft of servo motor 24 is caused to rotate at a speed proportional to the V/H ratio, as controlled by the $E_R$ signal. Consideration of the operating characteristics of the servo motor 24 and of the gear ratios necessary in the station computers 29 indicates that it is desirable to maintain this proportion at ratios other than 1:1. A preferred ratio and one actually used in an embodiment of this invention sets the servo motor output speed at either 5.63 V/H revolutions per second or 56.3 V/H revolutions per second. As will become apparent from the description given hereinbelow, the output speed of the central computer line shaft 17, to which the station computers 29 are coupled, is maintained at a constant value of 5.63 V/H revolutions per second.

The coupling of the output shaft 91 of servo motor 24 to the range gear changing mechanism 16 is shown in greater detail in Figures 4, 5, 6, 7 and 8 of the drawing. The range gear changing mechanism is a form of transmission with a preferred velocity ratio from input to output of either 1:1 or 1:10, as desired. Manifestly, other ratios may be employed in lieu of these preferred ratios with equally advantageous results.

As shown in Figure 4 the output shaft 91 of servo motor 24 is rotatably mounted in bearings 92 and 93 which, in turn, are secured in any suitable manner to the supporting structure 94. Gears 95 and 96 are secured to shaft 91, as for example, by threaded split hubs (not shown) attached to the gears together with nuts 97. Advantageously, retaining rings 98 may be positioned in annular grooves provided in shaft 91 to maintain the shaft, and hence gears 95 and 96, in a desired axial position.

The output shaft 17, which is the central computer line shaft, of the range gear changing mechanism 16 is rotatably mounted in bearings 99 and 100 which, in turn, are secured to the supporting structure 101. Retaining rings 102 are positioned in annular grooves in shaft 17 to maintain the shaft, and hence gears 103 and 104, in position axially. Gear 104 is rotatably mounted on line shaft 17 so as to mesh with gear 96. Gear 104 is restrained from axial movement by retaining rings 105 set in annular grooves in line shaft 17. Gear 103 also is rotatably mounted on line shaft 17 and is in mesh with gear 95. Gear 82 is restrained for axial movement by retaining rings 106 set in annular grooves of line shaft 17.

In the illustrated embodiment, gears 96 and 104 are identical and hence have a velocity ratio of 1:1. Gear 95 advantageously is smaller than gear 103 and in this embodiment the gears have a velocity ratio of 1:10. In accordance with an aspect of this invention, either gear 104 or gear 103 may be operatively coupled to line shaft 17 for rotating the latter by the gear shifter coupling generally indicated at 107 in Figure 4 and illustrated in greater detail in Figures 5, 6, 7 and 8.

Figure 5:
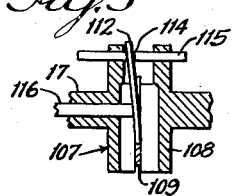

In Figure 5, the gear shifter coupling 107 is shown in the position for providing a 1:1 velocity ratio transmission from input shaft 91 to output line shaft 17. The coupling has a body 108, which advantageously may be an integral enlarged diameter of line shaft 17. The body 108 is provided with an annular groove 109 and a radial hole 110 to provide clearance for a spring 111. This is shown in greater detail in Figure 8 where it can be seen that the shape of spring 111 is such as to maintain the spring in position in groove 109 once it is pressed into this position. A formed central portion 112 of spring 111 tends to keep the spring in the position shown in Figure 5. A notch 113 at one edge of central portion 112 of the spring 111 operatively engages an annular groove 114 in driving pin 115. Driving pin 115 is assembled through two aligned holes in body 108 in such a manner that it has rotational freedom and is limited in axial movement by the central portion 112 of spring 111.

A selector pin 116 is positioned in an axial clearance hole in line shaft 17 and advantageously is made of sufficient length to contact the central portion 112 of spring 111 at one end of the pin and to extend beyond the end of line shaft 17 at the other end of the pin. It can be seen that if selector pin 116 is moved to the right from the position shown in Figure 5 it would overcome the spring force exerted by the central portion 112 of spring 111 and cause the central portion of the spring to assume the position illustrated in Figure 6. It will be noted that as the spring central portion 112 is moved to the right, it causes the driving pin 115 to move to the right along with it.

One preferred method for actuating the selector pin 116 is by the energization of the solenoid 117 shown in Figure 4. When the solenoid is energized, its armature 118 is placed into contact with selector pin 116 to move the selector pin to the right from the position shown in Figure 4 of the drawing. It now is understood that this results in driving pin 115 also being moved to the right with respect to its illustrated position in Figure 4.

When the solenoid 117 is de-energized, the coupling is in the normal position illustrated in Figure 4. In this position driving pin 115 is held by the pressure of the spring central portion 112 in a position where it will intercept longitudinally a pin 119 secured to gear 104 upon rotation of this gear. When the input shaft 91 is rotated by servo motor 24, gear 96 and its meshing gear 104 also are rotated. This causes pin 119 on gear 104 to engage driving pin 115 and the resulting rotary force is transferred to coupling body 108 to rotate line shaft 17 at a speed identical to that of shaft 91. It will be appreciated that as the servo motor driving shaft 91 is constrained by its method of connection to a single direction of rotation, back lash is of no consequence.

Figure 6:
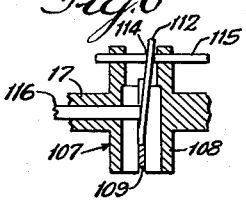
Figure 7:
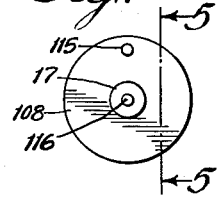
Figure 8:
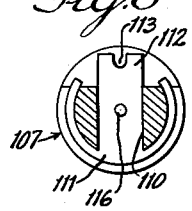

When the solenoid 117 is energized by the High Altitude signal over conductor 27 from the manual computer 12 or the scanner converter 11, as described above, selector pin 116 and hence driving pin 115 are moved to the position shown in Figure 6. In this position, driving pin 115 does not intercept pin 119 on gear 104 but the driving pin does intercept pin 120 secured to gear 103. When the servo motor output shaft 91 and gears 95 and 103 are rotated, pin 120 on gear 103 intercepts driving pin 115 on the coupling 107. Consequently, coupling 107 and hence line shaft 17 are rotated at a speed 1/10 of that of shaft 91 because of the reduction interposed by gears 95 and 103.

Referring now to Figure 1 of the drawing, it can be seen that line shaft 17 extends a considerable distance from the range gear change mechanism 16 to drive several additional components. Additionally, it now is understood that line shaft 17 is rotated at a speed proportional to the V/H ratio in accordance with signals supplied by either the optical scanner 10 or the manual computer 12. As shown in Figures 1 and 2, a synchro transmitter 18 of conventional design is coupled to the line shaft 17 such as by gear 121 secured to the line shaft and its meshing gear 122 coupled to synchro transmitter 18. As explained in greater detail below, synchro transmitter 18 is utilized to supply to the system a rotational data reference potential which is a function of the V/H information.

A plurality of station computers 29, such as those shown at computer station units 19, 20, 21 and 22, are detachably coupled to line shaft 17 at spaced intervals along the length of the line shaft. As shown in Figure 2, each station computer 29 is preferably coupled to line shaft 17 by means of a pair of miter gears 123 and 124; gear 123 is secured to line shaft 17 and gear 124 is secured to stub shaft 125. Advantageously, each station computer 29 is detachably coupled to its stub shaft 125 by means of a male coupling 126 secured to the stub shaft 125 which is adapted to engage a female coupling 127 secured to the input shaft 128 of the station computer 29.

The male coupling 126 and the female coupling 127 are keyed to fit together in only a single predetermined fashion for 360° of rotation to the end that the phase relation therebetween be constant, as explained further below.

The principal features of the construction of a station computer 29 are shown in Figure 9 of the drawing. Input rotational motion to the station computer 29 is effected by female coupling 127 secured to one end of the station computer input shaft 128. Shaft 128 is rotatably journaled in a bearing 129 and carries at its other end miter gear 130. Miter gear 130 is in mesh with miter gear 131 which is secured to the station computer drive shaft 132. Shaft 132 has affixed thereon a gear 133 in mesh with gear 135 and a gear 134 in mesh with gear 136, each of the gears 135 and 136 being carried by shaft 137.

A plurality of other shafts and gears are provided in station computer 129 and like shafts 132 and 137; each of these shafts is rotatably mounted in suitable bearings provided in frames 138 and 139.

Table I below describes the relation of the various gears and various shafts in the station computers and preferable gear ratios which obtain between various numbers of the gears:

TABLE I

| Shaft No. | Gears | Meshes with— | | Preferred Gear Ratio |
|---|---|---|---|---|
| | | Gear | On Shaft | |
| 132 | 134 | 136 | 137 | .22 |
| | 133 | 135 | 137 | 1 |
| 137 | 136 | 134 | 132 | .22 |
| | 135 | 133 | 132 | 1 |
| | 140 | 143 | 142 | 1 |
| | 141 | 144 | 142 | .5 |
| 142 | 143 | 140 | 137 | 1 |
| | 144 | 141 | 137 | .5 |
| | 146 | 148 | 149 | .5 |
| | 145 | 147 | 149 | 1 |
| 149 | 148 | 146 | 142 | .5 |
| | 147 | 145 | 142 | 1 |
| | 150 | 152 | 154 | .75 |
| | 151 | 153 | 154 | 1 |
| 154 | 152 | 150 | 149 | .75 |
| | 153 | 151 | 149 | 1 |
| | 156 | 158 | 159 | 1 |
| | 155 | 157 | 159 | .93 |
| 159 | 158 | 156 | 154 | 1 |
| | 157 | 155 | 154 | .93 |
| | 166 | 167 | 160 | 1 |
| | 161 | 163 | 165 | 4 |
| 160 | 162 | 164 | 165 | 1 |
| | 167 | 166 | 159 | 1 |
| | 164 | 162 | 160 | 1 |
| 165 | 163 | 161 | 160 | 4 |
| | 168 | 169 | 170 | 1 |
| 170 | 169 | 168 | 165 | 1 |
| | 171 | 172 | 173 | .5 |

Advantageously, each of the shafts 137, 142, 149, 154, 159 and 160 is provided with a gear shifter coupling 107 of the type shown in Figures 4, 5, 6, 7 and 8 between a pair of gears carried by the shaft. These gears, i.e., the gears having gear shifter coupling 107 positioned therebetween are rotatably mounted with respect to their shafts. The remaining gears are each fixedly secured to the shaft so as to rotate therewith. Further, it will be understood that each shaft having a gear shifter coupling thereon is hollow to provide clearance for the coupling selector pin 116, as described above.

Advantageously, a manually operated push button or remotely controlled operating means such as a solenoid, or both, is associated with the selector pins of each of the gear shifter couplings 107. Where only a solenoid is provided to effect the gear changing through a gear shifter coupling, a solenoid such as that schematically indicated at 175 in Figure 9 may be secured to a supporting structure by suitable fastening means (not shown) so that the solenoid plunger 176 is aligned with the selector pin 182 of coupling 107 on shaft 137. Thus, when solenoid 175 is energized its plunger 176 is actuated to move selector pin 182 to the right from the position shown in Figure 9 to effect a change in the position of the driving pin of the gear shifter and hence to change the operating gear ratio between shaft 132 and 137.

Still another preferred embodiment of a switching solenoid to effect gear changing is shown in Figure 9 by the solenoid indicated at 177. When the solenoid 177 is energized its plunger 178 contacts bell crank 179 which is pivotally mounted on pin 180. The bell crank 179 pivots counterclockwise on pin 180 to depress selector pin 181 on shaft 142. One advantageous feature of this arrangement is that a push button, such as that indicated at B, also may be used to pivot the bell crank 179.

It will be understood that each of the gear shifters in the station computer may be operated by either a solenoid of the types described above or a push button, such as those indicated at A, B, C, D, E and F for shafts 137, 142, 149, 154, 159, and 160, respectively, or by both a solenoid and a push button, if desired.

It is contemplated that the push buttons and the solenoids are of the type which remain in their actuated positions until they are released. Suitable push buttons and solenoids adopted for this purpose are known to those skilled in the art.

Now it can be appreciated that in accordance with the novel features of this invention, operator set up of the various gear ratios necessary for integration of the pre-flight variables into the station computer computation can easily and quickly be effected by means of the button and/or solenoid associated with each of the gear shifter couplings. The cooperation between the shifter couplings, the selector pins and the push buttons, together with the gear ratios obtained for each selector pin in its operated or released condition, are given in the following table.

TABLE II

| Shifter and Button Designation | Associated | | Preferred Gear Ratio | |
|---|---|---|---|---|
| | Shaft | Selector Pin | Shifter Depressed | Shifter Released |
| A | 137 | 182 | .22 | 1.0 |
| B | 142 | 181 | 1.0 | .50 |
| C | 149 | 183 | 1.0 | .50 |
| D | 154 | 184 | .75 | 1.0 |
| E | 159 | 185 | .93 | 1.0 |
| F | 160 | 186 | 4.0 | 1.0 |

It will be appreciated that the total station computer gear ratio for the illustrative station computer embodiment shown in Figure 9 is the product of the six individual gear shifter ratios. Further, it will be appreciated that the over-all gear ratio of the station computer may be varied as desired to obtain various picture taking rates. To determine the gear ratio, GR required for a specified picture taking rate, R, in pictures per second, the following equation may be used:

$$GR = \frac{RH}{5.63V} \qquad (3)$$

where the variables H and V have the same meanings described hereinabove.

A preferred method that may be used to obtain the station computer gear ratio, where the overlap and the other pre-flight variables have been specified, is by the use of a chart wherein the gear ratios for the more commonly used values of pre-flight variables have been pre-computed. This serves to substantially simplify the operator's task, for all he need do is refer to the chart and depress the combination of push buttons indicated thereon. For example, the embodiment of station computer illustrated in Figure 9 of the drawings advantageously may have associated therewith an instruction plate containing the information tabulated in Table III below for indicating the proper combinations of push buttons A, B, C, D, E and F to be depressed for predetermined sets of pre-flight variables:

TABLE III

| Format-Flight Direction: | Focal Length | | | | |
|---|---|---|---|---|---|
| 2¼, 1½ | 3 | --- | 6 | --- | 12 |
| 4½ | 6 | --- | 12 | --- | 24 |
| 9, 6 | 12 | --- | 24 | 36 | 48 |
| 18 | 24 | 36 | 48 | --- | --- |

| Optical Axis Overlap, Percent | | | | | Push In Buttons | | | | | |
|---|---|---|---|---|---|---|---|---|---|---|
| 20 | 57 | 60 | 80 | 90 | | | | | | |
| Depression Angle | | | | | | | | | | |
| 90 | --- | --- | --- | --- | None | B | BCD | BC | BDF | BF |
| --- | 90 | --- | --- | --- | BE | BCE | BDEF | BEF | BCDEF | BCEF |
| --- | --- | 90 | 30 | 15 | B | BC | BDF | BF | BCDF | BCF |
| --- | --- | 45 | --- | --- | BD | BCD | BC | BDF | BF | BCDF |
| --- | --- | 30 | 15 | --- | None | C | DF | F | CDF | CF |
| --- | --- | --- | 5 | --- | ACD | DE | None | BDE | B | BCDE |
| --- | --- | --- | --- | 5 | DE | BDE | B | BCDE | BC | BDEF |

Referring again to Figure 9, it can be seen that the synchro transmitter 30 advantageously may have its rotor driven at the same speed as the output of the station computer. The phase relationship of the synchro transmitter output is established with respect to a fixed position of the input coupling 127 and hence the line shaft 17 of the central computer. At this position the electrical zero of the synchro transmitter 30 is set. Positive location of the electrical zero of the synchro transmitter 30 with respect to the coupling 127 is made by the design of the gear shifter couplings 107 wherein driving contact between a gear and the couplings is effected in only one position for each revolution of the gear. As a result, the electrical zero and the phase relationship of the synchro transmitters in the different station computers can be made substantially identical for a given line shaft angular position if the shifter settings in the different station computers are the same.

The output of the synchro transmitter 30 thus provides a rotational IMC reference potential for one or more cooperating cameras at a given camera station. A cam 174 secured to shaft 173 is rotated at one half the speed of the station computer output by means of the reduction effected by gear 171 on the synchro transmitter shaft 170 and gear 172 on shaft 173. A pair pulse switches 175 and 176 are operatively associated with cam 174 and are positioned with respect to cam 174 to be alternately closed thereby, i.e., one switch of the pair is closed for each 180° of cam rotation. Further, switches 175 and 176 are located with respect to a fixed position of the input coupling 127 in a manner similar to that described above for the synchro transmitters 30 to the end that like switches of different station computers are closed at substantially the identical instant in time if the shifter settings in the different stations are the same.

It will be understood by those skilled in the art that more or less than two switches may be used with cam 174, provided the gear reduction between the switch operating cam shaft 173 and the station computer output is changed accordingly. It will further be understood that the number of couplings and the numerical value of their various corresponding gear ratios given in the above description of a station computer can be changed in accordance with the requirements placed on the control system, and that the foregoing description of a station computer with six gear shifter couplings and the various gear ratios indicated in Table II are merely illustrative of the invention.

Referring now to Figure 10, there are shown two pulse cameras 177 and 178, which are connected for either simultaneous or alternate sequential operation. A station computer, generally indicated at 179, has a suitable gear reduction from its output driving shaft 173 with its attached cam 174 to alternately effect closure of the two switches generally indicated at 180 and 181. A source of potential 182, which has its negative terminal connected to ground, has its positive terminal connected to the switch blades 183 and 184 of switches 180 and 181, respectively. The stationary contact 185 of switch 181 is connected to pulse camera 178 and the stationary contact 186 of switch 180 is connected to pulse camera 177. In actual practice, suitable pulse shaping circuits having a pulse output of constant duration regardless of pulse separation would be provided between the switches and the pulse cameras, but for the purpose of simplifying the explanation of the switch operation, these pulse shaping circuits have not been shown.

It now can be seen that with no connection between the conductors leading to pulse cameras 177 and 178, a pulse resulting from the closure of switch 181 actuates pulse camera 178 and similarly, after 180° of rotation of cam 174, a pulse resulting from the closure of switch 180 actuates pulse camera 177. It can readily be seen that if the conductors to the two pulse cameras are connected together, as by a conductor 187 shown dotted in Figure 10, closure of either switch 180 or 181 will actuate both cameras. Further, if only one camera is used, the inclusion of conductor 187 would result in that camera receiving pulses at the computed rate. Manifestly, inclusion of the connecting conductor 187 can be made either permanently or by a relay operated from some remote location.

Figure 11 is a simplified schematic diagram which shows in greater detail than in Figure 1 the connection of an autocycle camera 36 to the control system of the invention. The gear train of the station computer 29 drives the rotor 188 of synchro transmitter 30 at a speed proportional to the camera cycling rate. Rotor 188 receives power from a transformer 189 in the servo amplifier 37 by means of conductor 217. As the rotor 188 is rotated, varying voltages are impressed on the several stator windings 190 in a manner well known in the art.

A synchro receiver 191 located in the autocycle camera 36 has its stator windings 192 connected to the stator windings 190 of the synchro transmitter 30 in the station computer. The rotor 193 of the synchro receiver 191 is driven by the film drive motor 194 through a gear box 195. The synchro receiver rotor 193 has two windings 196 and 197 positioned 90° apart electrically. To facilitate the following explanation of the operation of the autocycle camera, rotor winding 197 will be designated as camera B winding and rotor winding 196 will be designated as camera A winding. The camera B winding 197 is in phase with the rotor 188 of the synchro transmitter 30 when the camera drive motor is rotating at the correct speed, and for zero phase relation the output from the camera B winding 197 will be at a maximum. The output of the camera A rotor winding 196 will be low under these conditions. Since the film drive mechanism 198 is driven by the film drive motor 194 simultaneously with the rotor 193 of the synchro receiver 191, for an in-phase relationship between the rotors of the synchro transmitter 30 and the synchro receiver 191, the film will be moved at the IMC velocity.

Here another of the features of this invention becomes apparent. The two synchros in combination with the film drive motor 194 and the servo amplifier 37 comprise a positional servo mechanism utilized as a velocity control device. The importance of this feature is evident when it is recalled that although a positional servo mechanism is subject to certain positional errors with respect to the synchro transmitter, its velocity error is substantially zero.

Since the power supplied to the rotor 188 of the synchro transmitter 30 by transformer 189 advantageously is derived from the aircraft power system, the frequency of its output will be that of the aircraft power system, a frequency which commonly is 400 cycles per second. As a result, the output of the camera synchro rotor 193 is a 400 cycle signal which is modulated at a frequency dependent on the speed difference between the two synchros. For example, if the relative motion between the two synchros is 60 r.p.m., then the modulation frequency is 1 cycle per second.

An illustrative example of the waveform of the camera synchro output when a speed difference exists is shown in Figure 12. When the camera is running at synchronous speed, but out of phase, the output is that of the waveform shown in Figure 13. It will be noted from Figure 13 that both output conductors from the synchro receiver rotor windings 196 and 197 have a signal amplitude proportional to the 400 cycle supply frequency, but no modulating frequency.

The outputs of the camera A winding 196 and the camera B winding 197 of the synchro receiver rotor 193 are applied to separate demodulation circuits in the servo amplifier 37. Camera B winding output is applied to demodulator 199, and camera A winding output is applied to demodulator 200. The demodulator outputs are shown in Figure 14 of the drawings. Direction arrow 201 in Figure 14 indicates wave progression for increasing time when the receiver synchro rotor 193 is underspeed and where signal A leads signal B. Direction arrow 202 in Figure 14 indicates wave progression for increasing time for the overspeed case where signal B leads signal A. It will be understood by those skilled in the art that phase reversal occurs whenever a camera synchro operating underspeed begins to operate overspeed or vice versa.

The outputs of demodulators 199 and 200 are applied to a logical computer 203 which serves to detect if camera A signal or camera B signal is leading. In addition, the camera A conductor from demodulator 200 applies an error signal to a voltage amplifier 204 which controls the output of a magnetic amplifier 205. Although amplifiers 204 and 205 may be constructed in accordance with voltage and magnetic amplifiers well known to those versed in the electronic arts, an illustrative construction for these amplifiers is shown in the schematic circuit of Figure 15. The magnetic amplifier 205 controls the armature current of drive motor 194 in the camera to complete the servo loop.

Whenever a speed difference exists between the transmitter synchro 30 and the camera drive motor, the logical computer 203 functions. For overspeed, the power supply from logical computer 203 to the magnetic amplifier 205 by way of conductor 206 is opened. For underspeed, a very large (in comparison to the A error signal) error signal is added from logical computer 203 to the output of amplifier 204 by way of conductor 207. This signal, occasionally referred to as a slugging signal, results in a relatively large output from amplifier 204 and causes maximum power output of magnetic amplifier 205. When the motor 194 and synchro receiver 193 are at the command speed, the computer 203 maintains power to the magnetic amplifier, but does not slug amplifier 204. In this case, only the A error signal is present at the input of amplifier 204, and it controls the two amplifiers to correct for any small difference in phase angle existing between the two synchro rotors 190 and 193.

An illustrative embodiment of servo amplifier 37 is shown in schematic form in Figure 15 of the drawings. When the system master on-off switch and the station power are on, D.C. power is supplied to the servo amplifier over conductor 210 and 400 cycle A.C. power is supplied to the servo amplifier over conductors 211 and 212. Conductor 212 is connected to primary winding 213 and the A.C. voltage thereon energizes transformer 189. Secondary winding 215 of transformer 189 supplies heater power to the various electron tubes. Winding 216 supplies excitation by conductor 217 to the rotor 188 of the synchro transmitter 190 in the station computer. Winding 214 supplies the A.C. voltage input for full wave rectifier 218 which comprises a bridge arrangement of diodes 219, 220, 221 and 222. Rectifier 218 is connected at its output to a filter comprising choke 244 and capacitor 245 and serves as the D.C. voltage supply over conductor 268 for the anodes of electron tubes 224, 225 and 226 in servo amplifier 37.

The modulated signals from camera A winding 196 and camera B winding 197 of synchro receiver rotor 193 are applied to separate windings 227 and 228, respectively, on transformer 189. The camera B signals are demodulated in the circuit consisting of resistor 229, diodes 230 and 231, resistor 232 and capacitor 233. The camera A signals are demodulated in the circuit consisting of resistor 234, diodes 235 and 236, resistor 237 and capacitor 238. Advantageously, the resistors in each demodulator circuit are maintained substantially equal so that the voltage amplitude at the input will equal the voltage amplitude at the output.

The demodulated camera B output from demodulator 199 is applied to the grid 240 of tube 224A through bias resistor 239. The demodulated camera A output from demodulator 200 is applied to the grid 243 of tube 224B through bias resistor 241, and through bias resistor 242 to the input of a conventional voltage amplifier generally indicated at 204 and comprising tubes 225 and 226. The anode current of tube 224A controls the coil 247 of relay R2 connected between the anode 246 and the D.C. voltage supply. The anode current of tube 224B controls the coil 248 of relay R1 connected between anode 249 and the D.C. voltage supply. Relays R1 and R2 together with relays R3 and R4, constitute a computer which serves to detect if the camera A or B demodulated signal is leading and hence, whether the camera is operating overspeed or underspeed.

Tables IV and V, which summarize the relay conditions for the various phase angles of demodulator output, are set out below to facilitate the description of computer operation. Table IV corresponds to the direction arrow 201 in the phase diagram of Figure 14, and Table V corresponds to the direction arrow 202.

TABLE IV
Underspeed

| θ | Signal A | Signal B | Relay R1 | Relay R2 | Relay R3 | Relay R4 | Amplifier—204 |
|---|---|---|---|---|---|---|---|
| $0-\frac{\pi}{2}$ | − | − | N | N | E | N | Proportional Control. |
| $\frac{\pi}{2}-\pi$ | + | − | E | N | E | N | Do. |
| $\pi-\frac{3\pi}{2}$ | + | + | E | E | E | E | Slugging. |
| $\frac{3\pi}{2}-2\pi$ | − | + | N | E | E | E | Do. |
| $2\pi-\frac{5\pi}{2}$ | − | − | N | N | E | E | Do. |
| $\frac{5\pi}{2}-3\pi$ | + | − | E | N | E | N | Proportional Control. |
| $3\pi-\frac{7\pi}{2}$ | + | + | E | E | E | E | Slugging. |
| $\frac{7\pi}{2}-4\pi$ | − | + | N | E | E | E | Do. |
| $4\pi-\frac{9\pi}{2}$ | − | − | N | N | E | E | Do. |

N=Not energized, E=energized.

TABLE V
Overspeed

| θ | Signal A | Signal B | Relay R1 | Relay R2 | Relay R3 | Relay R4 | Amplifier—204 |
|---|---|---|---|---|---|---|---|
| $\frac{9\pi}{2}-4\pi$ | − | − | N | N | E | E | Slugging. |
| $4\pi-\frac{7\pi}{2}$ | − | + | N | E | E | E | Do. |
| $\frac{7\pi}{2}-3\pi$ | + | + | E | E | E | E | Do. |
| $3\pi-\frac{5\pi}{2}$ | + | − | E | N | E | N | Proportional Control. |
| $\frac{5\pi}{2}-2\pi$ | − | − | N | N | E | N | Do. |
| $2\pi-\frac{3\pi}{2}$ | − | + | N | E | N | N | Cut off. |
| $\frac{3\pi}{2}-\pi$ | + | + | E | E | N | N | Do. |
| $\pi-\frac{\pi}{2}$ | + | − | E | N | N | N | Do. |
| $\frac{\pi}{2}-0$ | − | − | N | N | E | N | Proportional Control. |

N=Not energized, E=energized.

When the camera is operating underspeed and the station operate switch 250 is closed, the following conditions obtain. Closing of the operate switch 250 completes a circuit from ground through diode 251, resistor 252, coil 253 of relay R3, normally closed contacts 254 of relay R2, normally closed contacts 255 of relay R1 and conductor 210 to D.C. voltage source 256. Operate switch 250 also completes a circuit from ground through diode 257 and resistor 258 to the cathodes 259 and 260 of tube 224. Assuming for convenience that the operate switch is closed at $t=0$ in Figure 14, the following occurs during the first quarter cycle, or from phase angle zero to $\pi/2$.

During this period, both of the camera A and camera B error signals are negative so that neither half of tube 224 conducts and relays R1 and R2 are not energized. D.C. voltage from source 256 is applied over conductor 210 through the normally closed contacts 255 of relay R1, and the normally closed contacts 254 of relay R2 to coil 253 of relay R3 which is then energized. Relay R3 when energized closes its normally open contacts 261, 262, and 263, respectively. This establishes a new D.C. voltage path to maintain coil 253 of relay R3 energized through its contacts 262. Also, contacts 263 of relay R3 are closed to apply 400 cycles A.C. voltage from conductor 211 to the magnetic amplifier 205.

During this period, with the camera A error signal negative, the output of amplifier 204 signals the control windings of magnetic amplifier 205 to decrease the speed of the camera servo motor 194 in a manner analogous to, but the reverse of, that described below for the next quarter cycle. Current flow through the magnetic amplifier 205 is reduced to that required for magnetizing and, since this is far less than that required by the motor 194 to start, it remains stopped.

During the second quarter cycle or from $\pi/2$ to $\pi$, the camera A signal is positive and the camera B signal negative. Tube 224B then conducts to energize coil 248 of relay R1. Relay R1 operates to open its normally closed contacts 255 and to close its normally open contacts 264. This transfers the D.C. voltage from source 256 from contacts 255 to 264 of relay R1 from whence it is applied through the normally closed contacts 265 of relay R2 and through resistor 266 to ground. Relay R3, and hence magnetic amplifier 205, remain energized since relay R3 continues to be supplied through its now closed contacts 262. Since the camera A signal is positive, tube 225A of amplifier 204 conducts and drives the grid of tube 226B more negative. When the grid of tube 226B goes negative, tube 226B is cut off, and with it the control winding 267 of magnetic amplifier 205 that is connected between the tube D.C. voltage supply conductor 268 and the anode of tube 226B.

As the grid of tube 225A goes positive with the A error signal, its cathode 269 and cathode 270 of tube 225B tend to follow. This develops a positive going potential at the anode of tube 225B and, hence, at the grid of tube 226A. Tube 226A conducts and current flows from ground through resistance 268, tube 226A and the control winding 269 of the magnetic amplifier 205, to the D.C. voltage supply conductor 268. This current flow increases the saturation of the core of the magnetic amplifier 205 and current flows to the full wave bridge rectifier 284 comprising diodes 271, 272, 273 and 274, respectively, which supplies the film drive motor 194 in the camera 36 through conductors 275 and 276. Motor 194 starts, and its speed increases in proportion to the magnitude of the camera A error signal.

Assuming that camera 36 does not reach the command speed for some time and phase reversal of the A and B signals does not take place, then in the third quarter cycle from $\pi$ to $$\frac{3\pi}{2}$$

both the camera A and camera B signals are positive. As a result, both halves of tube 224 conduct to maintain the coil 248 of relay R1 energized and, further, to energize the coil 247 of relay R2. Relay R2 operates to close its normally open contacts 277 and 278. This completes a D.C. voltage circuit through the now closed contacts 264 of relay R1, the now closed contacts 278 of relay R2, the now closed contacts 261 of relay R3, coil 279 of relay R4, and resistor 266 to ground.

Thus energized, relay R4 operates to close its normally open contacts 280 and 281. Closure of contacts 281 establishes a new D.C. voltage circuit to maintain coil 279 of relay R4 energized. Also, the closure of contacts 280 of relay R4 applies the D.C. voltage on conductor 210 to the input of amplifier 204, i.e., at the grid of tube 225A, through now closed contacts 262 of relay R3, coil 253 of relay R3, now closed contacts 280 of relay R4 and bias resistor 282. This potential is very large in comparison to any camera A signal and, hence it is termed a slugging potential. It is present whenever relay R4 is energized. Amplifier 204 responds by applying a large potential difference to the control windings 267 and 269 of magnetic amplifier 205. This saturates the magnetic amplifier 205 and maximum current then flows to the camera drive motor 194 through magnetic amplifier winding 283, full wave bridge rectifier 284 and conductors 275 and 276.

During the fourth quarter cycle from $$\frac{3\pi}{2} \text{ to } 2\pi$$

relay R1 is de-energized in the manner described heretofore since the camera A signal is negative. The camera B signal remains positive and consequently relay R2 remains energized. The D.C. voltage circuit through contacts 255 of relay R1 and contacts 277 of relay R2 is opened at contacts 285 of relay R4. Relays R3 and R4 remain energized so that not only the applied power but also slugging of amplifier 204 and magnetic amplifier 205 continues.

From $$2\pi \text{ to } \frac{5\pi}{2}$$

in the fifth quarter cycle, both relays R1 and R2 are de-energized since both the camera A and B signals are negative. Relays R3 and R4 remain energized and full power continues to be applied to the film drive motor 194.

In the sixth quarter cycle from $$\frac{5\pi}{2} \text{ to } 3\pi$$

the camera A signal is positive and the camera B signal is negative. Thus, relays R1, R2 and R3 are in the same condition as in the second quarter cycle from $\pi/2$ to $\pi$ described above. The D.C. voltage applied to the ground side of coil 279 of relay R4 through now closed contacts 264 of relay R1 and normally closed contacts 265 of relay R2 causes relay R4 to become de-energized. This opens its contacts 280 to stop the slugging of amplifier 204, and proportional control of film drive motor speed 194 by the camera A signal resumes.

In the event that the film drive motor 194 is not yet up to command speed, the following four quarter cycles are the same as those in the period from $\pi$ to $3\pi$, etc. As soon as the camera motor 194 operates overspeed, a phase reversal of the demodulated camera error signals takes place and camera B signal leads camera A signal. Assuming that the motor goes overspeed while receiving a slugging voltage to increase its speed and that phase reversal of the A and B signals occur at $9\pi/2$ in Figure 14, the chart of Table V, supra, applies together with direction arrow 202 of Figure 14.

In the first quarter cycle of Figure 14 from $$\frac{9\pi}{2}$$

to $4\pi$ in the overspeed direction, both camera A and camera B signals are negative. Hence, relays R1 and R2 are deenergized. Relays R3 and R4 remain energized and full power continues to be applied to the film drive motor 194 to increase its speed.

In the second quarter cycle of overspeed, from $4\pi$ to $$\frac{7\pi}{2}$$

the camera A signal is negative and the camera B signal positive. Therefore, coil 247 of relay R2 is energized and relay R1 remains de-energized. The D.C. voltage circuit through relay contacts 255 of relay R1 and contacts 277 of relay R2 is opened at contacts 285 of relay R4. Relays R3 and R4 remain energized and full power continues to be applied to the camera film drive motor 194.

From $$\frac{7\pi}{2} \text{ to } 3\pi$$

in the third quarter cycle, both camera A and camera B signals are positive, and all four relays R1, R2, R3 and R4 are energized. Consequently, full power to the motor 194 continues.

In the fourth quarter cycle of overspeed from $3\pi$ to $$\frac{5\pi}{2}$$

the camera A signal is positive and the camera B signal is negative, thereby de-energizing relay R2. The D.C. voltage on conductor 210 then is applied through contacts 264 of relay R1 and contacts 265 of relay R2 to the ground side of coil 279 of relay R4, thereby de-energizing relay R4. This opens contacts 280 of relay R4 to stop the slugging of amplifier 204. Since relay R3 remains closed and the camera A signal is positive, power to the camera film drive motor 194 continues and the motor continues to increase in speed.

It should be noted that the example illustrated in Figure 14 is for the worst possible conditions, i.e., where the motor reaches overspeed and phase reversal occurs at or slightly prior to $$\frac{5\pi}{2} \text{ or } \frac{9\pi}{2}$$

Under these conditions, the motor 194 continues to increase in speed for four one-quarter cycles of the modulating frequency. While this is not probable in actual operation, if it does occur, then both the modulating frequency and the camera A error signal increase as the motor increases the error between its speed and the command speed. Hence, the time period consumed in these four quarter cycles is relatively short, and as the camera A error signal is comparatively large, the motor will assume the command speed quickly.

From $$\frac{5\pi}{2} \text{ to } 2\pi$$

in the fifth quarter cycle, both camera A and camera B signals are negative. Relay R3 remains energized and relays R1, R2 and R4 de-energized. Since the camera A signal is negative, amplifier 204 reverses the current to the control windings 267 and 269 of magnetic amplifier 205. This decreases the current flow through the magnetic amplifier and the film drive motor 194 is slowed down.

In the sixth quarter cycle from $$2\pi \text{ to } \frac{3\pi}{2}$$

the camera A signal is negative and the camera B signal is positive. Relays R1 and R4 remain de-energized, and relay R2 is energized. This establishes a D.C. voltage circuit through contacts 255 of relay R1, contacts 277 of relay R2, and contacts 285 of relay R4 to the ground side of coil 253 of relay R3. This de-energizes R3 and opens its contacts 263 which supply A.C. voltage to winding 283 of magnetic amplifier 205. With the magnetic amplifier 205 cut off, all power to the camera film drive motor 194 is cut off and its speed decreases.

Assuming that camera speed continues to be greater than the command speed so that phase reversal of the error signals does not occur, the magnetic amplifier 205 and the motor 194 will remain cut off until both of the camera A and B signals are negative as in the period from $$\frac{\pi}{2} \text{ to } 0 \text{ or } \frac{5\pi}{2}$$

to $2\pi$. In this quarter cycle, relay R3 is energized and with it the magnetic amplifier 205 as described hereinabove. Motor speed will continue to decrease during this period since the camera A error signal is negative, but if phase reversal does take place, proportional control by the camera A error signal continues in the next quarter cycle, as for example, the period from $$2\pi \text{ to } \frac{3\pi}{2}$$

of Figure 14, and the motor 194 will increase in speed since camera A signal will be positive.

When the station computer synchro 30 and the camera synchro 191 are running at the same speed, there is no modulating frequency output from the rotor 193 of the camera synchro. As described hereinabove, for a zero phase angle and synchronous speed between the rotors of the two synchros, the output of the camera B winding 197 is at a maximum and the output of the camera A winding 196 is substantially zero. The output from the demodulators 199 and 200 of the servo amplifier 37 reflects this condition. The demodulated camera B signal is at a maximum and negative while the camera A signal is substantially zero.

For slight errors in phase angle, the demodulated camera B output is slightly less negative and the camera A slightly more or less than zero. If the rotor 193 of the camera synchro 191 leads the rotor 188 of the station computer synchro 30, the camera A demodulated error signal is negative and hence reduces the power to the camera film drive motor 194 tending to drop it into phase. If the rotor 193 of the camera synchro 191 lags behind the rotor 188 of the station computer synchro 30, the camera A demodulated error signal is positive and hence increases amplifier power to the camera film drive motor 194 to attempt to bring it into phase.

As described heretofore, autocycle cameras are capable of providing their own shutter tripping pulses and are further capable of controlling the overlap of successive pictures as a function of camera design. It will be appreciated by those skilled in the art that because shutter trip is not independent of IMC, it is more difficult to provide for alternate sequential exposures in autocycle cameras than with pulse or pulse IMC cameras.

It is contemplated, however, to provide sequential operation of two autocycle cameras with the control system of the invention. This is attained by altering the pattern of push buttons depressed on the station computer so that one-half of the desired picture taking rate is present at the station computer output. One autocycle camera and its associated servo amplifier then are controlled in the manner described above. The second autocycle camera has its stator input shifted electrically 180° and is controlled in a similar manner. Both autocycle cameras in a system of this type would have gear shifting means adapted to double the speed of the film during the period that it is moving at IMC speed.

The IMC film speed of continuous strip cameras advantageously can be controlled in the same manner as that described for autocycle cameras. However, a D.C. generator tachometer may be added to the shaft of the camera drive motor. The output of this generator tachometer then is used as a speed reference by an exposure control system to automatically vary the width of the camera slit as a function of film speed.

The system connections for the simultaneous operation of two pulse IMC cameras 300 and 301 is shown in the simplified diagram of Figure 16 of the drawings. Camera 300 has operatively associated with it a servo amplifier 302 and camera 301 has operatively associated therewith a servo amplifier 303. Each camera and servo amplifier combination operates with respect to film IMC speed in the same manner as described heretofore for an autocycle camera. Unlike autocycle cameras, however, the pulse IMC camera does not originate its shutter tripping pulse but rather it depends upon an outside source for such pulses.

In Figure 16, the IMC film speed of the two cameras 300 and 301 is controlled by the synchro transmitter 30 in station computer unit 20 and the shutter controlling pulses originate in station computer unit 19 at the switches 304 and 305 therein. It will be understood that by thus separating the command sources for IMC film speed and shutter trip of a pulse IMC camera, it is possible to vary the overlap of successive photographs.

When the operate switch 306 is closed, a connection is provided between ground and the switch blades of the two pulse switches 304 and 305. Also, a ground connection is provided for the camera servo amplifiers 302 and 303. The film in each camera is moved at IMC speed until one of the two pulse switches 304 and 305 is closed by the action of cam 174. This operates the shutters of both cameras which then signal their respective film drive mechanisms to advance, at high speed, a fresh supply of film to the exposure area. After the film is advanced, the IMC speed is resumed until the next shutter operation.

A pulse IMC camera connected for day or night operation is shown diagrammatically in Figure 17 of the drawings. Camera 307 and its associated servo amplifier 308 are operated in an identical manner in either the day or night mode with respect to the film IMC speed under the control of the synchro transmitter 30 in the station computer. This operation is the same as that described above for autocycle cameras. With switch 309 in the flare release panel 310 open, as shown in Figure 17, the system is set for day operation.

Cameras used for both day and night operations usually have two electrically operated shutters arranged 180° out of phase with respect to each other. That is, when one shutter is open the other is closed and as each pulse is applied to both shutters these conditions are reversed.

In day operation, the shutter pulses originate at either of the switches 304 and 305 in station computer unit 19 and the pulses are fed through the normally closed contacts of switch 311 in station relay box 312 to a shutter control 313. The shutter control 313 is activated during day operation by closure of the operate switch 314 which connects shutter control 313 to ground through the normally closed contacts of switch 315 in the station relay box. The closure of either switch 304 or 305 by cam 174 results in the circuits of the shutter control 313 applying a pulse to the closed camera shutter to open the latter and, after a predetermined period of time, applying another pulse to the camera to close the second shutter and advance the film.

Conversion of the system shown in Figure 17 to night operation is made by closing the ready switch 309 on the flare release panel 310. This causes a potential to be supplied from source 316 to one terminal of the relay coil 317 and to the flash detector 318. Closure of the operate switch 314 connects the other terminal of relay coil 317 to ground and thus energizes the relay coil. Relay coil 317, when energized, controls the switch blades of switches 311 and 315 to enable pulses from the station computer to be transferred by switch 311 from the shutter control 313 to the flare ejector 319 through switch 309. The energization of coil 274 also de-energizes the shutter control 313 and energizes a camera circuit which opens the closed shutter and transfers the initiation of film re-cycle from the exposure control to the other camera shutter.

Pulses caused by the closure of either switch 304 or 305 result in a release of either a flash cartridge or a flare bomb, depending upon which is provided, from the flare ejector 319. When the flare or bomb explodes, the flash is detected by the flash detector 318 and the latter closes the open shutter of the camera and initiates re-cycle of the film. During this re-cycle, the shutter which was just opened is once again closed and the shutter which was just closed is re-opened. At the completion of re-cycle of the film and when it has resumed IMC speed, the closed shutter is opened to await the explosion of another flare.

Because of design factors inherent in the majority of IMC cameras, to maintain the command signal within the camera designed parameter it is necessary that only those push buttons on the station computer which correspond to 60% overlap be depressed. This requirement is further modified when the camera is mounted in a remotely controlled rotatable mount of the type described hereinbelow. With the camera control system shown in Figure 17, these requirements result in the need of two station computers if overlapping other than 60% is desired. With a system of this type, one computer would provide the pulses for the camera shutter for flares and the other computer would provide the IMC command signals. It will be appreciated by those skilled in the art that a system of this type would be constructed in a manner similar to the system shown in Figure 16.

A pulse camera 43 in an IMC camera mount 42 is shown generally in Figure 1 of the drawings and in greater detail in Figure 18 of the drawings. A servo motor 24 with power supplied by amplifier 25 and controlled by a D.C. generator 23 together with the error signal $E_R$ drives a central computer drive shaft 17 through gear changer 16 at a rotational speed of 5.63 V/H revolutions per second, as has been previously described hereinabove.

Coupled to the line shaft 17 as by the miter gears shown are a synchro transmitter 18 and the station computer 29 of station computer unit 19. The rotor 320 of synchro transmitter 18 is thus driven at a speed of 5.63 V/H. Also, it can be seen that rotor 320 receives power from a transformer 321 in servo amplifier 44.

A synchro receiver 322 located in an IMC mount actuator 323 has its stator windings 324 connected to the stator windings 325 of the synchro transmitter 18 in the central computer 14. The rotor 325 of the synchro receiver 322 is driven by a servo motor 327 through a gear box 328. The gear box 328 has a fixed speed increase equal to the V/H constant and for the example used throughout this specification, the fixed speed increase would be 5.63:1. The synchro receiver 322 in connection with its associated servo amplifier 44 controls the speed of servo motor 327 so that the latter rotates at a speed directly proportional to V/H. It will be appreciated that speed control is achieved in the same manner as described hereinabove for an autocycle camera.

The servo motor 327 also drives a one revolution clutch 329. A driving drum 330 is fixed to and rotates with the output shaft 331 of servo motor 327. A driven drum 332 is secured to a shaft 333 in any suitable manner so as to be in axial alignment with driving drum 330. A spring 334, secured to drum 332, is tightly coiled around the driving and driven drums 330 and 332, respectively, to operatively connect the drums to the end that when drum 330 is turned by servo motor 327, drum 332 is also turned.

A cam 335, shown as a round eccentrically mounted disc in both Figures 18 and 19, is secured to shaft 333 and rotates with it. It will be appreciated that the illustration of a round cam 335 is illustrative only of the fact that the uniform angular velocity of a shaft such as shaft 333 is converted to a rocking motion at the camera and that other methods and means for attaining this conversion advantageously can be substituted for the round cam 335.

The picture taking rate of the system shown in Figures 18 and 19 is controlled at the station computer unit 19 by the station computer 29 and switches 336 and 337. Output pulses are transmitted from switches 336 and 337 to a remote magnetic means, such as solenoid 338, in the mount actuator 323. When the solenoid is not energized, a compression spring symbolized by the arrow 339 holds the plunger 343 of solenoid 338 against the upturned arm 340 of spring 334. For servo motor operation in the direction indicated by the arrow 341 in Figure 19, the restraint upon the upturned arm 340 of spring 334 causes the spring coils to unwind and thereby slightly loosen the spring grip on the two drums 330 and 332. As a result, the drums are de-clutched and drum 332 together with cam 335 are not rotated to leave the camera 43 in a fixed position.

When the operate switch 342 connected to pulse switches 336 and 337 is closed, the closure of either pulse switch causes the energization of solenoid 338. The solenoid plunger 343 is moved to overcome the force of spring 339 and to release the upturned arm 340 of spring 334. Spring 334 then contracts to couple the two halves of the clutch and, consequently, the two drums 330 and 332. This results in a rotation of cam 335 which, in turn, rocks follower 344 and, through linkage 345, the pulse camera 43.

A switch 346 is closed whenever a block 347 attached to cam 335 comes into contact with it. Closure of the switch 346 places ground on conductor 347 to effect operation of the camera shutter and film re-cycle in the manner described heretofore. The switch 346 and the block 347 normally are positioned so that the camera trip pulse occurs when the camera optical axis is passing through or is near the vertical. At the completion of one revolution of cam 345 and clutch 329, the upturned spring 340 again contacts the plunger 343 of solenoid 338 to disengage the clutch. The above described cycle then is repeated at the next switch closure in the station computer.

It now can be pointed out that in vertical photographs the aircraft terrain H, of the equations set out heretofore, is essentially the same as the distance from the terrain to the focal plane of the cameras. If the depression angle of the camera optical axis is changed from 90° by rotating the camera, the distance from the camera focal plane to the terrain is changed from H to H′ in accordance with the following equation:

$$H = \frac{H}{\sine}\theta H' = \frac{H}{\sine}\theta$$

This equation shows that the equations for film IMC velocity and picture taking rate achieve their maximum values for vertical photography and decrease directly as the sine $\theta$ for decreasing values of this angle.

In aerial reconnaissance, both fixed and rotatable, side oblique camera mounts are commonly used and therefore it frequently is necessary in control systems for aerial photography to provide for changing camera depression angles. In accordance with the invention, this may be attained either at the camera or at the central computer. It is an aspect of the invention that for the IMC camera mount shown in Figures 18 and 19, provision for accommodating various depression angles is made at the mount actuator. For rotatable camera mounts having several discrete stopping points at either side of the vertical, a gear box with settable gear changes, corresponding to the sine of the depression angle for the various steps, advantageously is interposed between the servo motor 327 and the output cam 335. For rotatable mounts that can be varied in infinite steps, an infinitely variable speed drive may be substituted for the gear box. In either case, the output speed of the mount actuator servo motor is varied with the sine of the camera optical axis depression angle.

For cameras in rotatable mounts which are not provided with IMC mount actuators, a ratio change to provide for changing values of depression angle preferably is made at the station computer as shown in the schematic diagram in Figure 20. A pulse camera 471 is shown positioned in the rotatable mount symbolically illustrated at 472. The position of the mount 472 is maintained by the actuator 350 which advantageously is a type well known in the art and comprises all of the required power and position sensing means. The mount position control 351 contains the necessary circuitry for providing signals to actuator 350 and to the station computer 29 to respectively control the mount position and to modify the computation of camera cycling rate and film IMC speed. Thus, mount position control 351 may have switching means shown diagrammatically at 352 and comprising a pair of wipers 353 and 354. These wipers are mechanically ganged together and may be positioned as desired by the photographer by any suitable means such as an external knob on the mount position control 351.

Wiper 354 of switch 352 is adapted to be placed into contact with a selected one of a plurality of stationary contacts to provide the actuator 350 with a control signal corresponding to the mount position desired. This operation is effected by means of suitable conductors 455 connected between the stationary contacts and the mount actuator. Wiper 353 of switch 352 is adapted to be placed into contact with a selected one of a plurality of stationary contacts connected by means of conductors 356 to the several gear shifting solenoids in station computer 29

These solenoids, indicated by the representative solenoids 357 and 358 shown in Figure 20, are individually controlled by the switch 352 to provide for the changing gear ratio required. Each solenoid is operatively associated with a gear shifter coupler, either through a crank 179, as illustrated, or directly, as previously described in connection with Figure 9. As the output gear ratio is changed, then for any single value of V/H the output rotational speed is also changed. Hence, the pulse spacing between closures of the pulse switches 175 and 176 by cam 174, and the speed of the synchro transmitter, are changed in accordance with the changing depression angles.

While two solenoids 357 and 358 have been shown in the station computer and three more solenoids are indicated by the additional conductors 356, the actual number of solenoids incorporated in the station computer 29 to provide for changing values of the depression angle would vary with the requirements placed on the system and accordingly any number of solenoids might be provided. Further, although gear shifters have been indicated for this use, an infinitely variable speed transmission such as a ball and disc integrator could be interposed between pulse switches 175 and 176 of the synchro transmitter and the remainder of the gear train. It will be apparent to those skilled in the art that an infinitely variable speed drive of this type could be adapted to either manual or remote control for utilization in the invention.

An alternate station computer and pulse distribution system for pulse operating cameras is shown in the block diagram of Figure 21. As shown therein, the alternative station computer 360 is driven from the line shaft 17 at a speed proportional to V/H in the same manner as the station computer 29 whose operation has been described heretofore.

The station computer 360 at the alternative station computer unit 361 provides a series of fixed shaft speeds proportional to the V/H rotational input. Cams secured to the shafts operate switches to provide a series of pulses. In accordance with an aspect of the invention, the pulses may be selected by means of a switch located at the exterior of the station computer, which switch advantageously may be provided with designating letters for each switch position as shown in Figure 22.

The selected pulses chosen by the position of this switch are connected to suitably designed pulse shaping circuits which assure a constant pulse duration regardless of the pulse spacing. Pulse shaping circuits of this character are well known in the art. If desired, several switches for the selection of pulses may be provided and for each such switch a separate corresponding output channel is provided. In the illustrative embodiment shown in Figure 21, four such switches and output channels are provided although it is manifest that a greater or smaller number of switches may be used with the invention.

The entire assembly of gears, cams, cam switches, selection switches, and pulse shaping circuits are contained within station computer 360 at the computer station 361. Each of the four separate pulse channels from station computer 360 are connected in parallel to the station junction boxes 362 of the camera stations where pulse cameras are provided. Three such stations comprising cameras 32 and 33 at station #1, camera 473 at station #2 and cameras 39, 40 and 41 at station #3, are shown in the illustrative circuit of Figure 21 but it will be evident that many more camera stations may be utilized with this pulse system. The cameras at the three camera stations in Figure 21 are similar to the cameras described in conjunction with Figure 1 with the exception that all of the cameras are pulse operated. Additionally, the pulse system of Figure 21 may be used to provide the control pulse requirements for pulse IMC cameras with the IMC control requirements furnished by the synchro transmitters 30 at the various computer stations in the manner described heretofore.

Each station junction box 362 contains a switch for the selection of the pulses to the cameras from any of the four available channels. While a mechanical type of switch would be feasible for a small number of camera stations, a preferred arrangement would include a suitable relay switching circuit to avoid placing excessive loads on the station computer circuitry. Such relay switching circuits are well known in the art and are not illustrated in detail in Figure 21.

Figure 23 shows the gears, cams and switches of station computer 360 in greater detail. Input rotational motion to the station computer is effected by the coupling 127 which is secured to one end of the shaft 128. Advantageously, shaft 128 is rotatably journaled in bearing 365 and carries at its other end a miter gear 130. Miter gear 130 is in mesh with miter gear 366 which is secured to shaft 367. The gear train of the station computer shown in Figure 23 is given in Table VI as follows:

TABLE VI

| Shaft No. | Cams | Switches | Gears | Meshes with— | | | Overall Speed Ratio From Shaft 361 |
|---|---|---|---|---|---|---|---|
| | | | | Gear | On Shaft No. | Gear Ratio | |
| 367 | 375 | 387 | 403 | 405 | 368 | 2:1 | 1 |
| | | | | 406 | 370 | 1.5:1 | |
| | | | | 407 | 372 | 0.5:1 | |
| | | | 404 | 405 | 367 | 2:1 | |
| 368 | 376 | 388 | 408 | 409 | 369 | 2:1 | 2:1 |
| | | | | 410 | 371 | 1.5:1 | |
| 369 | 377 | 389 | 409 | 408 | 368 | 2:1 | 4:1 |
| 370 | 378 | 390 | 406 | 403 | 367 | 1.5:1 | 1.5:1 |
| 371 | 379 | 391 | 410 | 408 | 368 | 1.5:1 | 3:1 |
| | 380 | 392 | 407 | 404 | 367 | 0.5:1 | |
| | 381 | 394 | | 413 | 374 | 1.5:1 | |
| 372 | | 395 | 411 | 412 | 373 | 0.5:1 | 0.5:1 |
| | 382 | 393 | | | | | |
| | | 396 | | | | | |
| 373 | 383 | 397 | 412 | 411 | 372 | 0.5:1 | 0.25:1 |
| | 384 | 400 | 413 | 407 | 372 | 1.5:1 | |
| | 385 | 398 | | | | | |
| 374 | | | | | | | 0.75:1 |
| | | 401 | | | | | |
| | 386 | 399 | | | | | |
| | | 402 | | | | | |

It will be understood by those skilled in the art that all of the shafts in the station computer may be rotatably mounted in bearings or frames such as those indicated at 414 and 415 in Figure 23. Further, it will be understood that, as evidenced by the above listed Table VI and Figure 23, the cam switches and gears are operated at a speed proportional to that of the associated shafts. The cams on the various shafts are adapted to actuate a number of cam switches as shown in Figure 23. Advantageously, the cams and cam switches may take any suitable form and in a preferable embodiment of this invention each cam is a constant rise cam which is secured to its shaft to operate a cam lever affixed to a subminiature switch.

A simplified schematic diagram of the electrical portion of the station computer is shown in Figure 24. Four pulse selection switches 416, 417, 418 and 419, each corresponding to the switch shown in Figure 22, serve to connect the various pulse switches to four separate pulse shaping circuits. All four pulse selection switches are set to a position which connects them through pulse switch 397 to a D.C. voltage source 421 during the interval that switch 397 is closed. It will be obvious to those skilled in the art that each of the four pulse selection switches in the circuit shown in Figure 24 may be set to any of eight possible switch positions.

A pulse shaping circuit, generally indicated at 422, is shown connected to pulse selection switch 416 for channel #1. The pulse shaping circuit 422 comprises a relay whose coil 423 is connected at one terminal through the diode 424 to ground. The pulse shaping circuit 422 also comprises a pair of capacitors 425 and 426, a pair of resistors 427 and 428, and a diode 429, all connected across coil 423 to form a conventional RC time delay network.

One set of contacts 430 of relay coil 423 is used to hold the relay in its energized state during the established RC time period while a second set of contacts 431 of relay coil 423 is used to provide a D.C. voltage pulse on conductor 420 during the same period. Additional pulse shaping circuits of the type described for pulse shaping circuit 422 are shown in block diagram form in Figure 24 wherein pulse shaping circuit 433 is associated with pulse selection switch 417 of channel #2, pulse shaping circuit 434 is associated with pulse selection switch 418 of channel #3, and pulse shaping circuit 435 is associated with pulse selection switch 419 of channel #4.

The rotational input to the station computer is a function of $V/H$, as described hereinabove. This rotational input to the various gear trains results in the closure of the several pulse switches with variable spacing in time and with respect to $V/H$. In this manner, the rotational shaft speed is converted to pulses of fixed duration and with a spacing dependent upon the gear reduction and the value of $V/H$. In a preferable embodiment of the invention, a chart such as that shown in Table VII is affixed to the station computer to facilitate operator selection of the various pulse spacings available for each of the channels in the station computer. Table VII is in some respects similar to Table III set out above but it should be noted that Table III is based upon a consideration of overlap in the center of the format while Table VII is based upon the consideration of overlap to the near edge of the format for camera depression angles other than 90°. Manifestly, either Table III or Table VII may be used depending on overlap requirements.

TABLE VII

SQUARE FORMAT

[Use left side of columns for minimum 60% overlap. Use right side of columns for minimum 10% overlap]

| Format | Focal Length | | | | |
|---|---|---|---|---|---|
| 2¼ | 12 | 9 | 6 | 3 | 1½ |
| 4½ | 24 | 18 | 12 | 6 | 3 |
| 9 | 48 | 36 | 24 | 12 | 6 |
| A | 3° | 4° | 6° | 11° | 90° |
| B | 2° 11° | 2° 15° | 4° 23° | 7° 90° | 90° |
| BCD | 5° 20° | 7° 27° | 12° 45° | 24° | |
| BC | 9° 29° | 12° 41° | 19° 90° | 90° | |
| BDF | 16° 52° | 22° 90° | 37° | | |
| BF | 24° 90° | 34° | 90° | | |
| BCDF | 42° | 90° | | | |
| BCF | 90° | | | | |

Oblique overlap based on foreground coverage.

To provide for sequential operation of either two or four cameras, sequential circuits have been provided in the station computer. If, for example, cameras with 9" formats in the flight direction and having either 24" or 36" focal lengths are used, then the selection switch, generally indicated at 436 in Figure 24, may be operated to connect either pulses BCDF for a 36" focal length from pulse switch 391 or pulses BF for a 24" focal length from pulse switch 388 to the input of the pulse shaping circuit 439. Advantageously, pulse shaping circuit 439 may be identical to the pulse shaping circuit 422 described heretofore.

Switch 436 also connects the output of pulse shaping circuit 439 to either of two groups of four sequential switches. As shown in Figure 23 and Table VI, each of the two groups of four sequential switches is driven at a speed equal to one-fourth the speed of its corresponding pulse switch. In other words, for each four closures of pulse switch 391, sequential switch 402 is closed once, sequential switch 401 is closed once, sequential switch 398 is closed once and sequential switch 399 is closed once. Similarly, for each four closures of pulse switch 38, each of its corresponding sequential switches 395, 396, 394 and 393 is closed once. Thus, it will be appreciated that the pulses originated at one of the two pulse switches 391 or 388 are in this manner channelled out through one of the sequential switches to the output conductors 440, 441, 442, or 443.

Switch 437 provides operator selection for either two or four cameras in sequence. With the switch in the four-camera position, as shown in the drawings, all four sequential pulses are brought out on output conductors 440, 441, 442, and 443. When the switch 448 is in the two-camera position, i.e., when the switch blades are engaged with their contacts, the conductors are tied together in such a manner that only two pulses are available on the output conductors.

Distribution of the sequential pulses may be accomplished by routing one of the sequential outputs to the single camera station for which sequential operation is desired in each of the sequential channels. Alternatively, all four conductors may be connected to the various camera stations in the control system and means may be provided in the camera station selection switch for selecting the sequential lead desired. While rotatable mounts have not been shown for this description of the alternate station computer, it will be understood that provision therefor may readily be made in the station computer by suitably modifying the pulse selector switches of each of the channels. Appropriate rotatable mount controls then can be interconnected with the station computer.

As the configuration of present day aircraft usually is such as to prevent a pilot or an observer from viewing the terrain directly below the aircraft, it has been found advantageous to incorporate in aircraft utilized for photographic purposes an optical view finder of the type disclosed in the co-pending application of John R. Miles, filed October 16, 1956, and assigned Serial No. 616,258, now Patent No. 2,893,290. In accordance with a feature of this invention, suitable reticles may be introduced at image planes in the optical path of such view finders. These articles when suitably marked and positioned then may be used to provide information useful for both navigation and photo reconnaissance.

A view finder utilizing reticles of this type is shown in Figure 2 of the drawings at 50. One such reticle, indicated as 450 in Figure 2, may be seen in greater detail in Figure 25 wherein the reticle is shown as it appears when seen through the view finder. As described below, reticles of this type, if they are adapted to be positioned by the observer, may be used to determine aircraft drift to aid in flight line navigation. In addition, aircraft yaw or translation about a vertical axis perpendicular to the line of flight, may be determined so that where it is possible cameras and other instruments may be aligned with the line of flight. Further, the fields of coverage of various focal length-format size cameras may be indicated and the overlap of sequential photographs regulated.

Figure 25:
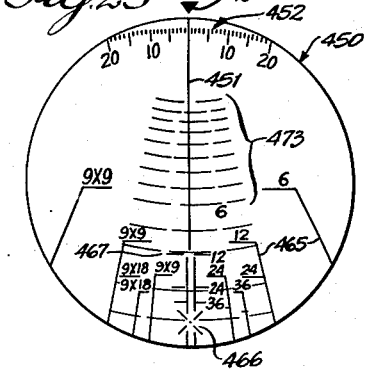
Figures 25, 26, 27 and 28 illustrate the principles of the view finder, as shown in Figure 2.

A track line 451 on the reticle 450 in Figure 25 may be used in conjunction with a calibrated drift scale 452 to determine aircraft drift or yaw. For example, in Figure 26 an aircraft 453 is illustrated as flying parallel to a desired track path shown symbolically as arrow 454. The wind operating on the aircraft is symbolized as arrow 455 at right angles to the aircraft 453 and consequently the desired track path is changed to the actual flight path indicated by arrow 456. With the drift scale 452 of the view finder oriented as shown in Figure 25 with respect to a fixed zero reference 457 (not a part of reticle 450), the observer would note a relative movement of ground objects diagonally across the reticle 450. By then rotating reticle 450, by means further described below, until the track line 451 parallels the movement of ground objects, the observer or pilot can determine his angular drift from drift scale 452.

Figure 26:
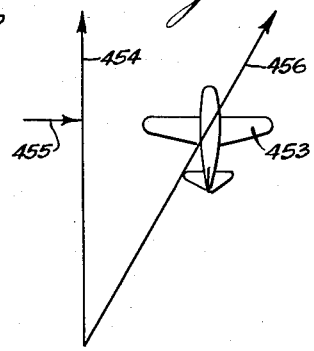
Figure 27:
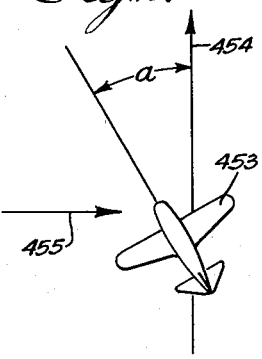

The condition of aircraft yaw is illustrated in diagram form in Figures 26 and 27. In Figure 27, the pilot has turned the aircraft 453 to angle alpha with respect to the desired track path 454 to thereby compensate for the wind 455. The yaw angle alpha can then be measured in the same manner as the drift angle.

Figure 28:
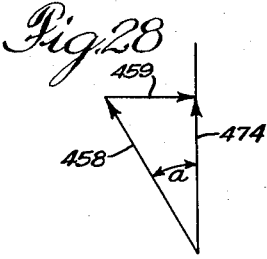

The velocity vectors for the yaw condition of Figure 27 are shown in Figure 28. Vector 474 represents the velocity along the line of flight, vector 458 represents the velocity of the aircraft 453 and vector 459 represents the wind component transverse to the line of flight. If cameras in the aircraft are aligned with respect to vector 458 while the aircraft is flying the resultant path indicated by vector 474, a significant error in film IMC speed occurs that is proportional to the sine of angle alpha. In addition, there also results a somewhat objectionable angular staggering of the sequential pictures.

To correct for this error in IMC and for the angular staggering of pictures, cameras and other instruments are often mounted in azimuth mounts so that they may be aligned with the actual aircraft track path. In accordance with aspects of this invention, signals to control the position of such azimuth mounts are automatically originated simultaneously with the positioning of the reticle 450 when the latter is used to determine drift or yaw angle. In Figure 2, the reticle 450 is shown as driven by a reversible motor 460 having an attached gear 461. It will be understood that gear teeth are provided on reticle 450 to mesh with the gear teeth on gear 461. The motor operation and its direction may be controlled by the operator from a suitable switch located in any convenient position near the operator.

A second gear 462 in view finder 450 having the same pitch as the reticle gear also is mated with motor gear 461. Gear 462 is secured to the shaft of a synchro transmitter 463. Thus, when the reticle is rotated by the motor 460, the rotor of synchro transmitter 463 is rotated through the same angle. It will be appreciated that advantageously the output of the synchro transmitter 463 then may be used to control the position of the azimuth mounts as desired. Reference is made to Figure 1 where this action is symbolically illustrated by the autocycle camera 36 at camera station 2 wherein camera 36 is mounted in an azimuth mount 38 connected to synchro transmitter 463 in view finder 50.

The L-shaped lines such as lines 465 shown on reticle 450 in Figure 25 indicate the visible portions of the fields of coverage for various format size-focal length camera combinations. It will be appreciated that the combinations shown in Figure 25 are merely illustrative and that any desired combination may be used. The cross, generally indicated at 466 on reticle 450, indicates the nadir or point directly beneath the aircraft when it is in normal flight attitude.

The determination of exposure interval can readily be made by measuring the transit time of an object on the ground from the horizontal line designated with a numeral equal to the focal length of the camera used, such as line 467, to the nadir symbol 466. Thus, in the event of a failure of the computing means, the pulse cameras controlled by the system may be manually triggered through a switch adapted to this purpose and the desired percentage of overlap thus maintained. As can readily be understood, any one set of such timer marks provided is for a single overlap percentage and format size combination.

To provide a monitor for the system source of the velocity to altitude ratio $V/H$ and to aid in its determination, a second reticle 468 is provided in the view finder 50 of the control system of the invention. Reticle 468, hereinafter referred to as a traveling grid 468, advantageously comprises a generally opaque disc of glass or other suitable material having a translucent spiral marked thereon. It is a feature of this invention that alternatively the traveling grid may be constructed with an opaque spiral marked on a translucent disc but in the illustrative embodiment described below, the former arrangement will be utilized. Further, it will be appreciated that the spiral may be formed such that the distance between any two adjacent lines represents equal increments of distance on the terrain below the aircraft for a specific orientation of the optical axis of the view finder to the terrain.

The traveling grid 468 is secured to the shaft of a synchro receiver 469, as shown in Figure 2. Synchro receiver 469 is operatively connected by means of conductors 470 to a synchro transmitter 18 in the central computer 14. As described hereinabove, the synchro transmitter 18 in the central computer is driven at a speed proportional to $V/H$ as a result of its mechanical coupling through gears 121 and 122 to the line shaft 17. As a result of this arrangement, the synchro receiver 469 together with its traveling grid 468 also are rotated at a speed proportional to the $V/H$ value.

Advantageously, a source of light, such as electric lamp 471, is positioned beneath the traveling grid 468 to provide illumination therefor. The image of the grid then is projected into the optical system by means of a field lens (not shown) and a beam splitting prism 472. If desired, a pellicle or any other suitable means may be used in place of the beam splitting prism 472. Also, it will be understood that the traveling grid 468 could be inserted directly in the optical system at an image point but the arrangement shown in Figure 2 is the preferred arrangement of this invention.

Further, if it is desired, a mask may be used to restrict the portion of the traveling grid 468 that is visible to the eye of the observer. That portion of traveling grid 468 which is visible to the observer when such a mask is used is illustrated by the broken lines, generally indicated at 473 on reticle 450 in Figure 25.

The traveling grid 468 may be integrated into the determination of the $V/H$ value by suitable adjustment of the speed of grid rotation. Thus, if the movement of the lines of the spiral on traveling grid 468 across the field of view of the view finder is adjusted to coincide with the apparent movement of ground objects, this advantageous result is attained. It now will be understood that to monitor the system source of $V/H$ data, it is only necessary for the observer to observe the movement of one or more traveling grid lines relative to an object on the terrain and if there is a coincidence, the $V/H$ ratio is correct.

In addition to serving a monitoring or supervisory function, the traveling grid 468 also may be used in determining the $V/H$ ratio. One of the two variables is set at an arbitrary value, which either is assumed at random or is chosen from the aircraft instrument panel. This value is then set into the manual computer 12 and the other variable is adjusted until the traveling grid lines coincide with apparent ground object movement. If the arbitrary variable which is first chosen is known with a fair degree of accuracy, as for example, if altitude is obtained from an altimeter or a doppler radar, the other variable, velocity, may be determined with relative precision.

It also would be apparent that the spacing of the lines on the traveling grid 468 for equal ground distances is dependent in part on aircraft drift. Accordingly, the traveling grid 468, its synchro receiver 469 and the mask, if one is used, should be rotated around the optical axis of the traveling grid 468 to compensate for drift or yaw. While means for accomplishing this have not been shown, the rotation of the traveling grid system may be performed directly by the drift reticle motor 460 or by means of an auxiliary system controlled by synchro 463. Manifestly, where compensation for drift is not necessary, this provision may be omitted. In an aerial control system constructed in accordance with the present disclosure, it was found that for drift or yaw angles as high as 10°, the error in traveling grid spacing did not exceed 5% along the aircraft track line.

It will be understood by those skilled in the art that changes may be in the construction and arrangement of the parts of the disclosed illustrative embodiments without departing from the real spirit and purpose of the invention and that it is our intention to cover by the claims any modified forms of structure or use of equivalents which may reasonably be included within the scope.

What is claimed as the invention is:

1. A control system for aerial cameras comprising signal generating means for providing electrical signals proportional to the aircraft velocity to altitude ratio, a rotatable shaft, velocity servo motor means having its input connected to said signal generating means and its output connected to said rotatable shaft for converting said electrical signals to a shaft rotation having a speed corresponding to said electrical signals, and camera operating means coupled to said shaft and having selectively operable means for modifying the speed of said shaft, and means connecting said camera operating means to the aerial cameras for controlling the operation of the aerial cameras in accordance with said shaft rotation and the operation of said selectively operable means.

2. A control system for aerial cameras comprising signal generating means for providing electrical signals proporational to the aircraft velocity to altitude ratio, a rotatable shaft, velocity servo motor means having its input connected to said signal generating means and its output connected to said rotatable shaft for converting said electrical signals to a shaft rotation having a speed corresponding to said electrical signals, a camera station remote from said shaft including at least one aerial camera and camera operating means having its output connected to said camera station and having selectively operable means coupled to said shaft for modifying the speed of said shaft for controlling the operation of said aerial camera in accordance with said shaft rotation and the operation of said selectively operable means.

3. A control system for aerial cameras comprising signal generating means for providing electrical signals proportional to the aircraft velocity to altitude ratio, a rotatable shaft, velocity servo means having its input connected to said signal generating means and its output connected to said rotatable shaft for converting said electrical signals to a shaft rotation having a speed corresponding to said electrical signals, a first synchro transmitter operatively coupled to said shaft, a station computer operatively coupled to said shaft, selectively operable means including a variable speed transmission connected to said station computer for varying the output of said station computer in accordance with given pre-flight data, a second synchro transmitter coupled to the output of said station computer, an optical view finder including a monitor synchro receiver connected to said first synchro transmitter, and an image motion compensation camera having a synchro receiver adapted to control the operation thereof connected to said second synchro transmitter.

4. A control system for aerial cameras comprising signal generating means for providing electrical signals proportional to the aircraft velocity to altitude ratio, a rotatable shaft, velocity servo means having its input connected to said signal generating means and its output connected to said rotatable shaft for converting said electrical signals to a shaft rotation having a speed corresponding to said electrical signals, a station computer operatively coupled to said shaft and including selectively operable means for varying the output of said station computer in accordance with given pre-flight data, pulse switching means at the output of said station computer, and remotely located pulse operated aerial camera means connected to said pulse switching means and controlled thereby for operation in accordance with the aircraft velocity to altitude ratio and said pre-flight data.

5. A control system for aerial cameras comprising signal generating means for providing electrical signals proportional to the aircraft velocity to altitude ratio, a rotatable shaft, velocity servo means having its input connected to said signal generating means and its output connected to said rotatable shaft for converting said electrical signals to a shaft rotation having a speed corresponding to said electrical signals, station computer means coupled to said shaft and adapted to provide an output rotation in accordance therewith and a selectively operable variable speed transmission in said station computer means for varying said output rotation in accordance with selected pre-flight data.

6. A control system for aerial cameras in accordance with claim 5 further comprising a remotely located pulse operated aerial camera, operating means at said aerial camera for controlling its operation, and pulsing means in said station computer means and responsive to said output rotation connected to said operating means, said pulsing means including a cam driven at said output rotation and pulse switching means operated by said cam.

7. A control system for aerial cameras in accordance with claim 6 further comprising means for monitoring said aircraft velocity to altitude ratio including a view finder having a synchro receiver, and a synchro transmitter coupled to said shaft and connected to said syncro receiver for causing the latter to rotate at the speed of said shaft.

8. A control system for aerial cameras in accordance with claim 7 wherein said view finder further includes a travelling grid coupled to said synchro receiver for rotation therewith, whereby the travelling grid is rotated in synchronism with the terrain to be photographed only when the determination and conversion of the circuit velocity to altitude ratio is correct.

9. A control system for areial cameras in accordance with claim 5 further comprising range gear shifting means coupled to said rotatable shaft and responsive to said electrical signals having an amplitude indicative of a velocity to altitude ratio below a predetermined amount for increasing the speed of rotation of said shaft by a high altitude constant and further responsive to electrical signals having an amplitude indicative of a velocity to altitude ratio above said predetermined amount for reducing the speed of rotation of said shaft by said high altitude constant.

10. A control system for aerial cameras comprising signal generating means for providing electrical signals having an amplitude proportional to the aircraft velocity to altitude ratio, a rotatable line shaft, servo means having its input connected to said signal generating means and its output coupled to said line shaft for causing said shaft to rotate at a speed corresponding to the amplitude of said signals, a station computer coupled to said line shaft and adapted to be driven at the shaft speed, said station computer having a plurality of shafts including an output shaft, a plurality of gears carried by said shafts, and gear shifting means for coupling various ones of said gears on said shafts, selectively actuatable means for operating said gear shifting means as desired to cause said output shaft to rotate at a speed determined by the speed of said line shaft and by the operated ones of said selectively actuatable means, a synchro transmitter coupled to said output shaft for providing electrical signals in accordance with the speed of rotation of said ouput shaft, and switch means operatively associated with said output shaft for providing camera operating signal pulses in accordance with the speed of rotation of said output shaft.

11. A control system for aerial cameras comprising signal generating means for providing electrical signals proportional to the aircraft velocity to altitude ratio, a rotatable line shaft, servo means having its input connected to said signal generating means and its output coupled to said line shaft for causing said shaft to rotate at a speed corresponding to said signals, at least one station computer coupled to said line shaft and adapted to be driven at the shaft speed, said station computer having a plurality of shafts including an output shaft, a plurality of gears carried by said shafts, and gear shifting means for coupling various ones of said gears on said shafts, and selectively actuatable means in said station computer for operating said gear shifting means to cause said output shaft to rotate at a speed determined by the speed of said line shaft and by the operated ones of said selectively actuatable means.

12. A control system for aerial cameras comprising signal generating means for providing electrical signals proportional to the aircraft velocity to altitude ratio, a rotatable line shaft, servo means having its input connected to said signal generating means and its output coupled to said line shaft for causing said shaft to rotate at a speed corresponding to said signals, a station computer coupled to said line shaft and adapted to be driven at the shaft speed, said station computer having a plurality of shafts including an output shaft, a plurality of gears carried by said shafts, and gear shifting means for coupling various ones of said gears on said shafts, selectively actuatable means for operating said gear shifting means as desired to cause said output shaft to rotate at a speed determined by the speed of said line shaft and by the operated ones of said selectively actuatable means, and switch means operatively associated with said output shaft for providing camera operating signal pulses in accordance with the speed of rotation of said output shaft.

13. A control system for aerial cameras comprising signal generating means for providing electrical signals proportional to the aircraft velocity to altitude ratio, said signal generating means being selectively an optical scanner or a manually operable computing potentiometer, a rotatable line shaft, servo means having its input connected to said signal generating means and its output coupled to said line shaft for causing said shaft to rotate at a speed corresponding to said signals, a station computer coupled to said line shaft and adapted to be driven at the shaft speed, said station computer having a plurality of shafts including an output shaft, a plurality of gears carried by said shafts, and gear shifting means for coupling various ones of said gears on said shafts, selectively actuatable means for operating said gear shifting means as desired to cause said output shaft to rotate at a speed determined by the speed of said line shaft and by the operated ones of said selectively actuatable means, a synchro transmitter coupled to said output shaft for providing electrical signals in accordance with the speed and position of said output shaft, and switch means operatively associated with said output shaft for providing camera operating signal pulses in accordance with the speed of rotation of said output shaft.

14. A control system for aerial cameras comprising signal generating means for providing electrical signals proportional to the aircraft velocity to altitude ratio, a rotatable line shaft, servo means having its input connected to said signal generating means and its output coupled to said line shaft for causing said shaft to rotate at a speed corresponding to said signals, a station computer coupled to said line shaft and adapted to be driven at the shaft speed, said station computer having a plurality of shafts including an output shaft, a plurality of gears carried by said shafts, and gear shifting means for coupling various ones of said gears on said shafts, selectively actuatable means for operating said gear shifting means in accordance with predetermined pre-flight data to cause said output shaft to rotate at a speed determined by the speed of said line shaft and said pre-flight data, and means operatively associated with said output shaft for providing camera operating signals in accordance with the speed of rotation of said output shaft.

15. A control system for aerial cameras comprising signal generating means for determining the aircraft velocity to altitude ratio and providing electrical signals representative thereof, a rotatable shaft, servo means having its input connected to said signal generating means and its output coupled to said shaft and responsive to said electrical signals for causing said shaft to rotate at a speed proportional to said electrical signals, aerial camera means, camera controlling means coupled to said shaft and connected to said aerial camera means for controlling the operation of the latter in accordance with the velocity to altitude ratio, optical means for monitoring the determination of said velocity to altitude ratio, said optical means comprising a view finder adapted to provide viewing of the ground below the aircraft, a traveling grid in said view finder, synchro receiving means operatively associated with said traveling grid for rotating the latter to cause moving grid lines to be present in the view finder field, and synchro transmitter means coupled to said shaft and connected to said synchro receiving means for rotating said traveling grid at a speed corresponding to the aircraft velocity to altitude ratio whereby the grid lines are moved in synchronism with the ground only when the determination of the velocity to altitude ratio is correct.

16. A control system for aerial cameras comprising optical scanning means for determining the aircraft velocity to altitude ratio and providing electrical signals representative thereof, a rotatable shaft, servo means having its input connected to said optical scanning means and its output coupled to said shaft and responsive to said electrical signals for causing said shaft to rotate at a speed proportional to said electrical signals, optical means for monitoring the determination of said velocity to altitude ratio, said optical means comprising a view finder adapted to provide viewing of the ground below the aircraft, a traveling grid in said view finder, synchro receiving means operatively associated with said traveling grid for rotating the latter to cause moving grid lines to be present in the view finder field, and synchrotransmitter means coupled to said shaft and connected to said synchro receiving means for rotating said traveling grid at a speed corresponding to the aircraft velocity to altitude ratio whereby the grid lines are moved in synchronism with the ground only when the determination of the velocity to altitude ratio is correct.

17. A control system for aerial cameras comprising means for determining the aircraft velocity to altitude ratio and causing a rotatable shaft to be rotated at a speed proportional thereto, optical means for monitoring the determination of said velocity to altitude ratio comprising a view finder adapted to provide viewing of the ground below the aircraft, a traveling grid in said view finder, synchro receiving means operatively associated with said traveling grid for rotating the latter to cause moving grid lines to be present in the view finder field, and synchro transmitter means coupled to said shaft and connected to said synchro receiving means for rotating said traveling grid at a speed corresponding to the aircraft velocity to altitude ratio whereby the grid lines are moved in synchronism with the ground only when the determination of the velocity to altitude ratio is correct.

18. A control system for aerial cameras comprising signal generating means for determining the aircraft velocity to altitude ratio and providing electrical signals representative thereof, a rotatable line shaft, servo means having its input connected to said signal generating means and its output connected to said rotatable line shaft and responsive to said electrical signals for causing said line shaft to rotate at a speed corresponding to the velocity to altitude ratio, variable speed transmission means coupled to said line shaft, said variable speed transmission means including an output shaft and selectively actuatable means for causing said output shaft to rotate at a speed determined by the speed of said line shaft and by the operation of said selectively actuatable means, a cam coupled to said output shaft, pulse switching means operatively associated with said cam and adapted to be operated at a rate determined by the speed of cam rotation, aerial camera means, and means for connecting said pulse switching means to said aerial camera means for controlling the picture taking rate of the latter.

19. A control system for aerial cameras in accordance with claim 18 wherein said selectively actuatable means comprises a plurality of remotely controlled solenoids, said solenoids being operable in various selectable combinations indicative of the pre-flight data.

20. A control system for aerial cameras in accordance with claim 18 wherein said selectively actuatable means comprises a plurality of manually operable push buttons, said push buttons being operable in selected combinations indicative of the pre-flight data.

21. In a system for controlling the picture taking rate and the image motion compensation for aerial cameras, the improvement of means for determining the aircraft velocity to altitude ratio and providing a line shaft rotation at a speed representative thereof, and computing means coupled to said line shaft for generating picture taking rate and image motion compensation signals for aerial cameras, said computing means including an input shaft coupled to said line shaft, an output shaft, and a plurality of intermediate shafts operatively disposed between said input and said output shafts, said shafts carrying a plurality of gears and gear shifting couplers, and selectively actuatable means for operating said gear shifting couplers to provide variable speed changes between the input shaft and the output shaft of said computing means whereby the speed of rotation of said output shaft is determined by the speed of rotation of said line shaft and the particular ones of said selectively actuatable means which are actuated to operate the gear shifting couplers.

22. A control system for aerial cameras comprising signal generating means for providing electrical signals representative of the aircraft velocity to altitude ratio, a range gear shifter having input and output shafts, a rotatable line shaft connected to said output shaft, said line shaft being adapted to control the operation of the aerial cameras at a plurality of camera stations, servo means connected to said range gear shifter and said signal generating means and adapted to respond to said electrical signals to cause said input shaft to rotate at a speed proportional to the velocity to the altitude ratio, and solenoid means responsive to said electrical signals for operating said range gear shifter to the end that the output shaft thereof is caused to rotate at a speed equal to the speed of said input shaft when the velocity to altitude ratio is above a first predetermined amount and the output shaft of the range gear shifter is caused to rotate at a higher proportional speed than said input shaft when the velocity to altitude ratio is below a second predetermined amount.

23. A control system for aerial cameras comprising signal generating means for providing electrical signals representative of the aircraft velocity to altitude ratio, a range gear shifter having input and output shafts, a rotatable line shaft connected to said output shaft, said line shaft being adapted to control the operation of aerial camera means, servo means connected to said range gear shifter and said signal generating means and responsive to said electrical signals to cause said input shaft to rotate at a speed proportional to the velocity to the altitude ratio, and solenoid controlled means responsive to said electrical signals for operating said range gear shifter to the end said output shaft is caused to rotate at a speed equal to the speed of said input shaft when the velocity to altitude ratio is relatively high and to rotate at a higher proportional speed than said input shaft when the velocity to altitude ratio is relatively low.

24. A control system for aerial cameras in accordance with claim 23, wherein said solenoid controlled means comprises a coupler having two operating states, a solenoid operated actuating pin connected to said coupler wherein said coupler is in one of its stable states when the solenoid is de-energized and in the other of its stable states when the solenoid is energized and gearing means connected to said input and output shafts adapted to be meshed in one fashion by the coupler in said one stable state and meshed in a different fashion by the coupler in said other stable state.

25. A control system for aerial cameras in accordance with claim 24, wherein said coupler comprises a body portion fixedly secured to said output shaft, said body portion carrying therewithin a resilient member, supporting a gear engaging member having two operating positions for enabling said output shaft to be driven at the speed of said input shaft or at a higher speed than said input shaft, and means operatively associating said resilient member with said solenoid operated actuating pin.

26. A control system for aerial cameras of the type having image motion compensation signals provided thereto for controlling camera operation in accordance with said signals comprising signal generating means for providing electrical signals representative of the aircraft velocity to altitude ratio, means for converting said electrical signals to a line shaft rotation, means for modifying said line shaft rotation in accordance with pre-flight data, synchro transmitter means controlled by said modified line shaft rotation, synchro receiver means connected to said synchro transmitter means, a camera operating motor coupled to said synchro receiver means and a positional servo system operative to control the speed of said motor in accordance with said velocity to altitude ratio and said pre-flight data, said positional servo system comprising said synchro receiver means, said motor, and servo amplifier means, connected in circuit between said synchro receiver means and said motor, for determining whether said synchro receiver means is rotating in phase with and at the speed of said synchro transmitter means or at a higher or lower speed than said synchro transmitter means and for providing correcting voltages to said film drive motor to cause the synchro receiver means to rotate in phase with and at the speed of said synchro transmitter means.

27. A control system for aerial cameras of the type having image motion compensation signals provided thereto for controlling camera operation in accordance with said signals comprising signal generating means for providing electrical signals representative of the aircraft velocity to altitude ratio, means for converting said electrical signals to a line shaft rotation, means for modifying said line shaft rotation, synchro transmitter means controlled by said modified line shaft rotation, synchro receiver means connected to said synchro transmitter means, a camera operating motor coupled to said synchro receiver means and a positional servo system operative to control the speed of said motor in accordance with said modified line shaft rotation, said positional servo system being operative to determine whether said synchro receiver means is rotating in phase with or at a speed higher than or lower than the speed of the modified line shaft rotation and to provide correcting voltages to said motor, if required, to cause the synchro receiver means to rotate at the speed of said synchro transmitter means.

28. A control system for aerial cameras of the type having image motion compensation signals provided thereto for controlling camera operation in accordance with claim 27 further comprising selectively actuatable means connected between said line shaft and said synchro transmitter means for modifying the speed of rotation of the latter in accordance with selected pre-flight variables.

29. A control system in accordance with claim 28 further comprising a servo amplifier having a first demodulator connected to one winding of a synchro receiver means rotor, a second demodulator connected to another winding of the synchro receiver means rotor, a logical computer connected to outputs of said first and second demodulators, said logical computer being adapted to determine which of the two demodulator outputs is leading in phase, a voltage amplifier connected to one of said demodulators and to said logical computer, a magnetic amplifier connected to the outputs of said logical computer and said voltage amplifier, and means connecting the output of said magnetic amplifier to said camera operating motor whereby the logical computer opens the power circuit to said magnetic amplifier at suitable intervals to cause the speed of said camera operating motor to be reduced when the latter is operating at a speed higher than the speed of the synchro transmitter, and the logical computer provides a slugging voltage to said voltage amplifier at suitable intervals to cause the magnetic amplifier to operate at maximum output for increasing the speed of said camera operating motor when the latter is operating at a speed lower than the speed of said synchro transmitter.

30. A control system for aerial cameras of the type having image motion compensation signals provided thereto for controlling speed of film travel in accordance with said signals comprising signal generating means for providing electrical signals representative of the aircraft velocity to altitude ratio, means for converting said electrical signals to a line shaft rotation, means for modifying said line shaft rotation, synchro means controlled by said modified line shaft rotation, a film drive motor coupled to said synchro means and a positional servo system operative to control the speed of said film drive motor in accordance with said modified line shaft rotation, said positional servo system comprising said synchro means, said film drive motor and servo amplifier means connected in circuit between said synchro means and said film drive motor, for sensing when said film drive motor is rotating out of phase with the modified line shaft rotation and for providing correcting voltages to said film drive motor to cause the latter to rotate in phase with said modified line shaft rotation.

31. A control system for operation of reconnaissance equipment in an aerial carrier comprising signal generating means for providing electrical signals proportional to the aerial carrier velocity to altitude ratio, means for converting said signals to a primary shaft rotation having a rotational velocity which is a function of the velocity to altitude ratio, and selectively adjustable coupling means responsive to said primary shaft rotation for providing a plurality of secondary shaft rotational speeds corresponding to equipment cycling rates for various combinations of equipment parameters.

32. A control system for operation of reconnaissance equipment in an aerial carrier in accordance with claim 31 further comprising synchro means operated at a rotational input speed equal to said secondary shaft rotational speed to provide image motion compensation signals for said aerial reconnaissance equipment.

References Cited in the file of this patent

UNITED STATES PATENTS

| | | |
|---|---|---|
| 2,370,966 | Jochum | Mar. 6, 1945 |
| 2,401,530 | Vought | June 4, 1946 |
| 2,413,349 | Hancock et al. | Dec. 31, 1946 |
| 2,439,295 | Hammond et al. | Apr. 6, 1948 |
| 2,474,323 | Rattray | June 28, 1949 |
| 2,490,628 | Isserstedt | Dec. 6, 1949 |
| 2,507,459 | Sandvik et al. | May 9, 1950 |
| 2,523,267 | Aschenbrenner et al. | Sept. 26, 1950 |
| 2,599,517 | Raspet | June 3, 1952 |
| 2,713,814 | Sonne et al. | July 26, 1955 |
| 2,772,479 | Doyle | Dec. 4, 1956 |

OTHER REFERENCES

Photogrammetric Engineering, vol. XXI, No. 5, December 1955, pages 757–761 cited.

Photogrammetric Engineering for December 1955; pages 765–778 cited.